(12) United States Patent
Rusanovskyy et al.

(10) Patent No.: US 11,985,307 B2
(45) Date of Patent: May 14, 2024

(54) DERIVING A RICE PARAMETER FOR CODING HIGH BIT DEPTH VIDEO DATA

(71) Applicant: QUALCOMM Incorporated, San Diego, CA (US)

(72) Inventors: Dmytro Rusanovskyy, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 17/658,396

(22) Filed: Apr. 7, 2022

(65) Prior Publication Data

US 2022/0337812 A1 Oct. 20, 2022

Related U.S. Application Data

(60) Provisional application No. 63/173,269, filed on Apr. 9, 2021.

(51) Int. Cl.
| | |
|---|---|
| *H04N 19/105* | (2014.01) |
| *H04N 19/174* | (2014.01) |
| *H04N 19/176* | (2014.01) |
| *H04N 19/186* | (2014.01) |
| *H04N 19/30* | (2014.01) |

(52) U.S. Cl.
CPC ......... *H04N 19/105* (2014.11); *H04N 19/174* (2014.11); *H04N 19/176* (2014.11); *H04N 19/186* (2014.11); *H04N 19/30* (2014.11)

(58) Field of Classification Search
CPC .. H04N 19/105; H04N 19/174; H04N 19/176; H04N 19/186; H04N 19/30
See application file for complete search history.

(56) References Cited

U.S. PATENT DOCUMENTS

| | | | |
|---|---|---|---|
| 11,445,183 B2* | 9/2022 | Zhu | H04N 19/176 |
| 2022/0109844 A1* | 4/2022 | Pham Van | H04N 19/91 |

OTHER PUBLICATIONS

International Search Report and Written Opinion—PCT/US2022/071628—ISA/EPO—dated Aug. 5, 2022, 15 Pages.
Rusanovskyy D., et al., "CE-3.5 and CE-3.6: Combination of CE-1.2, CE-1.4/1.5 and CE-1.3", 21. JVET Meeting, Jan. 6, 2021-Jan. 15, 2021, Teleconference, (The Joint Video Exploration Team of ISO/IEC JTC1/SC29/WG11 and ITU-T SG 16), No. JVET-U0066, Jan. 12, 2021 (Jan. 12, 2021), 10 Pages.

(Continued)

*Primary Examiner* — Jae N Noh
(74) *Attorney, Agent, or Firm* — Shumaker & Sieffert, PA

(57) ABSTRACT

An example device for coding (encoding and/or decoding) video data includes a memory configured to store video data; and one or more processors implemented in circuitry and configured to: calculate a sum of absolute values of a plurality of neighboring coefficients to a current coefficient for a current block of video data; calculate a base level offset value according to at least one of a bit depth for the video data or a slice type for a slice including the current block; calculate a normalized value for the sum of absolute values using the base level offset value; and code the current coefficient using the normalized value for the sum of absolute values.

40 Claims, 10 Drawing Sheets

(56) References Cited

OTHER PUBLICATIONS

Rusanovskyy (Qualcomm)., D., et al., "CE-1.1 and CE-1.2: On the Rice Parameter Derivation for High Bit-Depth Coding", 21, JVET Meeting, Jan. 6, 2021-Jan. 15, 2021, Teleconference, (The Joint Video Exploration Team of ISO/IEC JTC1/SC29/WG11 and ITU-TSG.16), No. JVET-U0064, Dec. 30, 2020 (Dec. 30, 2020), XP030293126, 12 Pages, IVET-U0064.docx [retrieved on Dec. 30, 2020].

Van L.P., et al., "AHG12: On the Rice Parameter Derivation for High Bit-Depth Coding", JVET-T0105_v1, 20. JVET Meeting, Oct. 7, 2020-Oct. 16, 2020, Teleconference, (The Joint Video Exploration Team of ISO/IEC JTC1/SC29/WG11 and ITU-T SG.16), No. JVET-T0105, Oct. 7, 2020 (Oct. 7, 2020), 6 Pages.

Bross B., et al., "Versatile Video Coding (Draft 10)", Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 29, 2020-Jul. 3, 2020, Online, (Motion Picture Expert Group or ISO/IEC JTC1/SC29/WG11), No. JVET-S2001-vH, Sep. 4, 2020 (Sep. 4, 2020), XP030293002, 551 Pages, Retrieved from the Internet: URL: https://dms.mpeg.expert/doc_enq_user/documents/131_Teleconference/wg11/mS4716-JVET-S2001-v17-JVET-S2001-vH.

Browne A., et al., "CE on Entropy Coding for High Bit Depth and High Bit Rate Coding", JVET-U2022-r4, Joint Video Experts Team (JVET) of ITU-T SG 16 WP 3 and ISO/IEC JTC 1/SC 29, 21st Meeting, by Teleconference, Jan. 6-15, 2021, pp. 1-9.

Browne A., et al., "Common Test Conditions for High Bit Depth and High Bit Rate Video Coding", JVET-U2018-v2, Joint Video Experts Team (JVET) of ITU-T SG 16 WP 3 and ISO/IEC JTC 1/SC 29, 21st Meeting, by Teleconference, Jan. 6-15, 2021, pp. 1-8.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Rusanovskyy D., et al., "CE-3.4: Combination of CE-1.2 and CE-2.1," JVET-U0065, Joint Video Experts Team (JVET), of ITU-T SG 16 WP 3 and ISO/IEC JTC 1/SC 29, 21st Meeting, by teleconference, Jan. 6-15, 2021, pp. 1-5.

Rusanovskyy D., et al., "CE-related: On History-Enhanced Method of Rice Parameter Derivation for Regular Residual Coding (RRC) at High Bit Depths", 22. JVET Meeting, Apr. 20, 2021-Apr. 28, 2021, Teleconference, (The Joint Video Experts Team of ISO/IEC JTC1/SC29/WG11 and ITU-T SG 16 WP 3), No. JVET-V0106, m56518, Apr. 13, 2021 (Apr. 13, 2021), pp. 1-9, XP030294253, Retrieved from the Internet: URL: https://jvet-experts.org/doc_end_user/documents/22_Teleconference/wg11/JVET-V0106-v1.zip, JVET-V0106.docx, [retrieved on Apr. 13, 2021].

Van L.P., et al., "AHG12: On the Rice Parameter Derivation for High Bit-Depth Coding", JVET-T0105_v2, Joint Video Experts Team (JVET) of ITU-T SG 16 WP 3 and ISO/IEC JTC 1/SC 29, 20th Meeting, JVET-T0105_r2, by Teleconference, Oct. 7-16, 2020, pp. 1-7.

\* cited by examiner

DERIVING A RICE PARAMETER FOR CODING HIGH BIT DEPTH VIDEO DATA

This application claims the benefit of U.S. Provisional Application No. 63/173,269, filed Apr. 9, 2021, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for deriving a Rice parameter for coding video data, e.g., high bit depth video data. In particular, the Rice parameter may be used when performing regular residual coding (RRC), which may include encoding and/or decoding. These techniques may be applied in ITU-T H.266/Versatile Video Coding (VVC) or other video coding standards. The techniques of this disclosure are generally directed to determination of a Rice parameter to be used to binarize a current coefficient of a transform block of video data, where determination of the Rice parameter includes using a base level offset value. The base level offset value may be calculated according to at least one of a bit depth for the video data or a slice type for a slice of the video data. The base level offset value may then be applied to a sum of absolute values for neighboring coefficients to the current coefficient to calculate a normalized value. The normalized value may be used to determine the Rice parameter, e.g., from a look-up table. The Rice parameter may then be used to binarize a value for the current coefficient.

In one example, a method of coding (encoding and/or decoding) video data includes calculating a sum of absolute values of a plurality of neighboring coefficients to a current coefficient for a current block of video data; calculating a base level offset value according to at least one of a bit depth for the video data or a slice type for a slice including the current block; calculating a normalized value for the sum of absolute values using the base level offset value; and coding the current coefficient using the normalized value for the sum of absolute values.

In another example, a device for coding (encoding and/or decoding) video data includes a memory configured to store video data; and one or more processors implemented in circuitry and configured to: calculate a sum of absolute values of a plurality of neighboring coefficients to a current coefficient for a current block of video data; calculate a base level offset value according to at least one of a bit depth for the video data or a slice type for a slice including the current block; calculate a normalized value for the sum of absolute values using the base level offset value; and code the current coefficient using the normalized value for the sum of absolute values.

In another example, a computer-readable storage medium has stored thereon instructions that, when executed, cause a processor of a device for coding video data to: calculate a sum of absolute values of a plurality of neighboring coefficients to a current coefficient for a current block of video data; calculate a base level offset value according to at least one of a bit depth for the video data or a slice type for a slice including the current block; calculate a normalized value for the sum of absolute values using the base level offset value; and code the current coefficient using the normalized value for the sum of absolute values.

In another example, a device for coding (encoding and/or decoding) video data includes means for calculating a sum of absolute values of a plurality of neighboring coefficients to a current coefficient for a current block of video data; means for calculating a base level offset value according to at least one of a bit depth for the video data or a slice type for a slice including the current block; means for calculating a normalized value for the sum of absolute values using the base level offset value; and means for coding the current coefficient using the normalized value for the sum of absolute values.

The details of one or more examples are set forth in the accompanying drawings and the description below. Other features, objects, and advantages will be apparent from the description, drawings, and claims.

DETAILED DESCRIPTION

Figure 1:
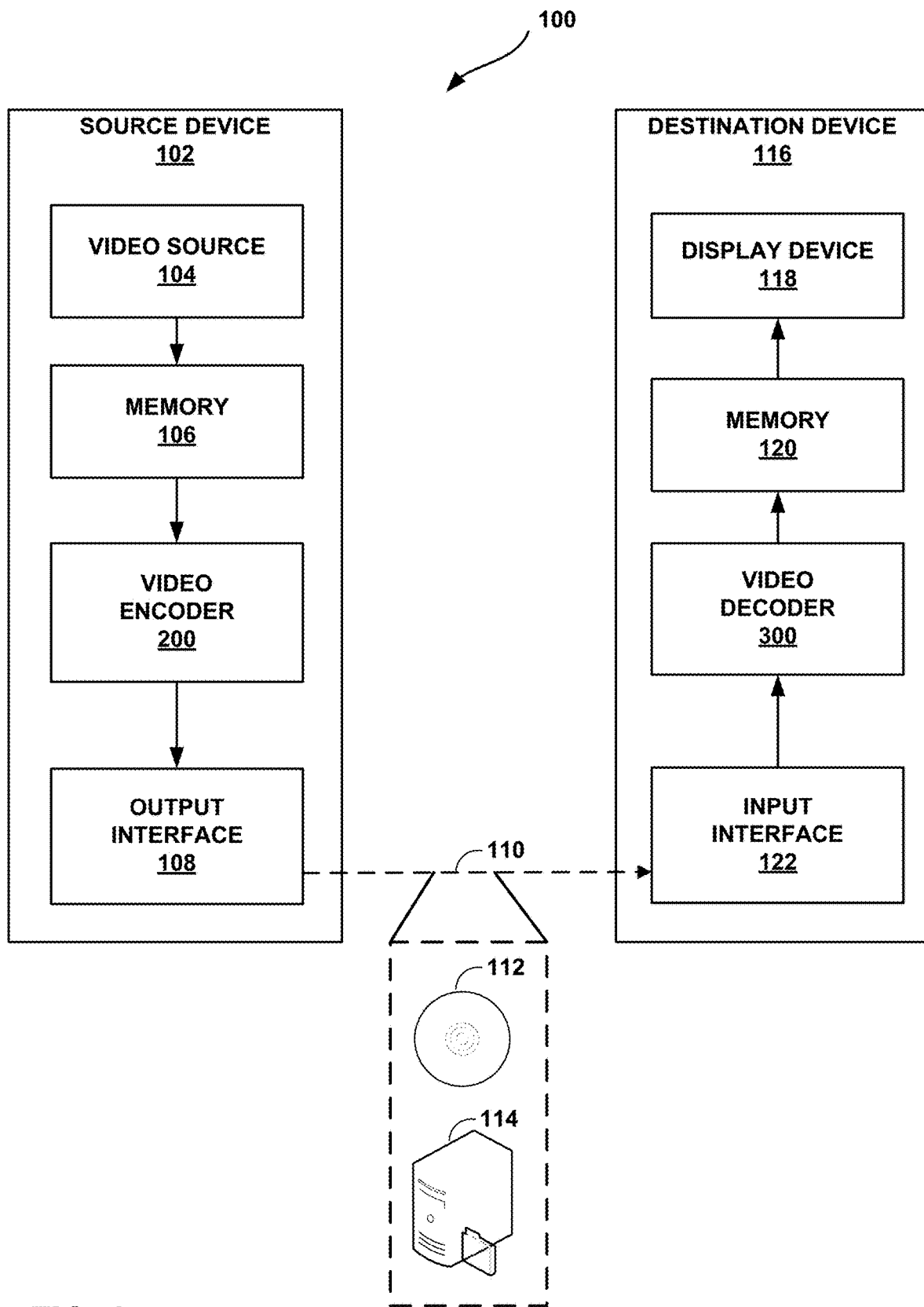
FIG. 1 is a block diagram illustrating an example video encoding and decoding system that may perform the techniques of this disclosure.

Rice parameter values may be used to code (encode or decode) coefficients of residual blocks of video data. In particular, the Rice parameter may be used when binarizing a value, associated with entropy coding (encoding or decoding) the value. The use of Rice parameter values ranging from 0 to 3, inclusive, has been extensively tested in development of the ITU-T H.266/Versatile Video Coding (VVC) standard. Typically, the Rice parameter values are scaled using a clipping formula that also uses as input a bit depth of corresponding video data. The clipping formula that was originally developed for VVC was premised upon a bit depth of 8-bits or 10-bits. If the bit depth is increased beyond 10-bits, however, the clipping function may no longer effectively clip the Rice parameter values to be within the range of 0 to 3 bits, which may lead to a drastic increase in codeword sizes, and therefore, signaled values in a bitstream. This disclosure describes techniques that may avoid such increases in codeword sizes and data signaled in the bitstream when using Rice parameters to code video data using high bit depths (e.g., bit depths beyond 10 bits).

A video coder (encoder or decoder) may be configured to use the techniques of this disclosure to code (encode or decode) a value for a current coefficient of a transform block. In particular, the video coder may initially calculate a sum of absolute values of neighboring coefficients to the current coefficient. The video coder may then calculate a base level offset value to apply to the sum of absolute values according to either or both of a bit depth for the video data and/or a slice type for a slice including the transform block. The video coder may then calculate a normalized value for the sum of absolute values using the base level offset value. The video coder may then code the current coefficient using the normalized value. As noted above, the techniques of this disclosure may be applied in contexts where the bit depth can extend beyond 10 bits. Thus, calculating the base level offset value according to the bit depth may allow the Rice parameter to be clipped to remain within 0 to 3 bits.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The High-Efficiency Video Coding (HEVC), was finalized by the Joint Collaboration Team on Video Coding (JCT-VC) of ITU-T Video Coding Experts Group (VCEG) and ISO/IEC Motion Picture Experts Group (MPEG) in April, 2013.

The Joint Video Experts Team (JVET), a collaborative team formed by MPEG and ITU-T Study Group 16's VCEG, continues to develop video coding techniques for and beyond the Versatile Video Coding (VVC) standard. The primary objective of VVC is to provide a significant improvement in compression performance over the existing HEVC standard, aiding in deployment of higher-quality video services and emerging applications such as 360° omnidirectional immersive multimedia and high-dynamic-range (HDR) video. A draft of the VVC standard can be found in Benjamin Bross, Jianle Chen, Shan Liu and Ye-Kui Wang, "Versatile Video Coding (Draft 10)" Joint Video Experts Team (JVET) of ITU-T SG 16 WP 3 and ISO/IEC JTC 1/SC 29/WG 11, Doc. JVET-S2001, 19th Meeting: Teleconference, 22 Jun.-1 Jul. 2020, available at phenix.it-sudparis.eu/jvet/doc_end_user/documents/19_Teleconference/wg11/JVET-S2001-v17.zip.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding high bit depth video data using Rice parameters. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for coding high bit depth video data using Rice parameters. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that code high bit depth video data using Rice parameters.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

When encoding transform coefficients of a transform block, video encoder 200 may encode values for syntax elements including, for example, a significant transform coefficient flag (indicating whether the coefficient has an absolute value greater than zero), a greater than one flag (indicating whether the coefficient has an absolute value greater than one), a greater than two flag (indicating whether the coefficient has an absolute value greater than two), a remainder value (representing the amount by which the absolute value of the coefficient exceeds two), and a sign flag (representing whether the value for the coefficient is positive or negative).

Figure 2:
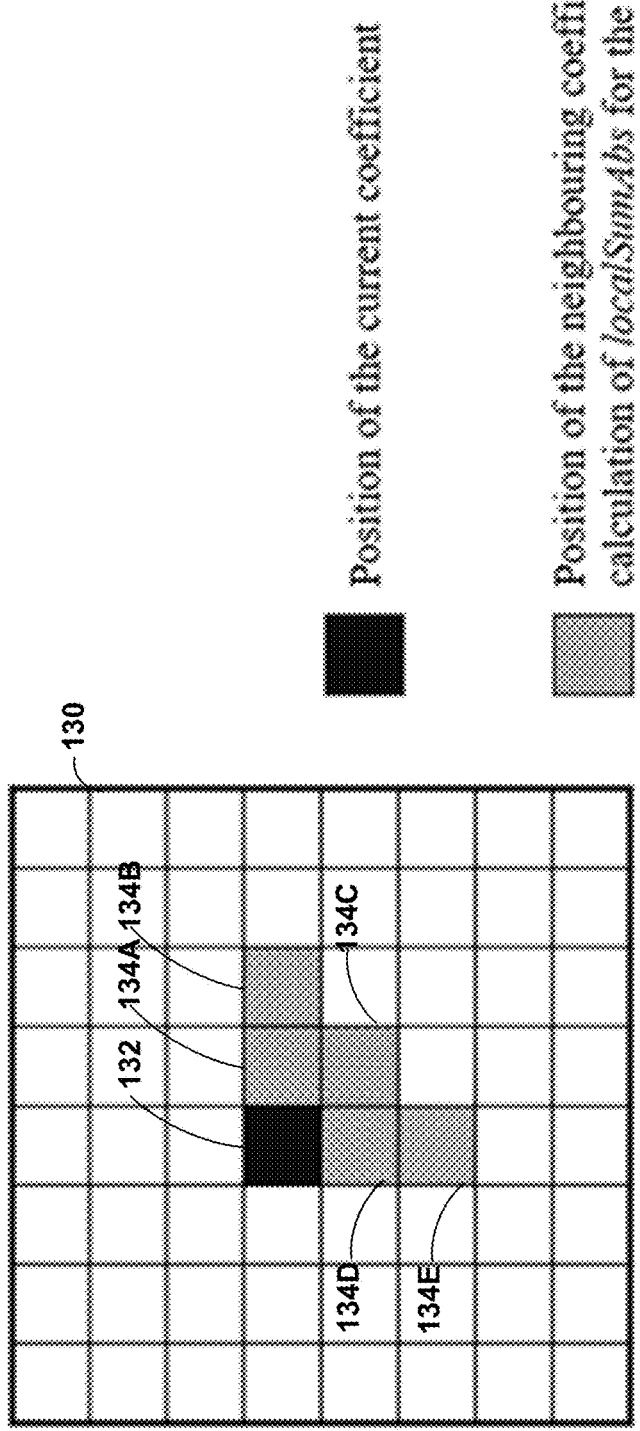
FIG. 2 is a conceptual diagram illustrating an example of neighboring coefficients to a current coefficient that may be used to calculate a sum of local absolute values (locSumAbs).

When encoding the remainder value of a current coefficient, video encoder 200 may binarize the remainder value using a Rice parameter. According to the techniques of this disclosure, to determine the Rice parameter, video encoder 200 may calculate a sum of absolute values of neighboring coefficients to the current coefficient. For example, video encoder 200 may calculate absolute values for coefficients to the right, two to the right, below, two below, and below and to the right of the current coefficient, as shown in FIG. 2 below. Video encoder 200 may then add each of the calculated absolute values to form a sum of absolute values value. Video encoder 200 may then determine at least one of a bit depth and/or a slice type for a slice including the current block.

Video encoder 200 may then calculate a base level offset value according to the bit depth and/or the slice type, e.g., using equation (1) as discussed in greater detail below. Video encoder 200 may then calculate a normalized value for the sum of absolute values using the base level offset value. For example, video encoder 200 may calculate the normalized value using equation (2) as discussed in greater detail below. Video encoder 200 may then derive a Rice parameter using the normalized value for the local sum of absolute values, e.g., per Table 1 discussed in greater detail below. Video encoder 200 may then form a Golomb-Rice code for the normalized value for the sum of absolute values using the Rice parameter.

To perform CABAC, video encoder 200 may assign a context within a context model to a symbol to be transmitted. The context may relate to, for example, whether neighboring values of the symbol are zero-valued or not. The probability determination may be based on a context assigned to the symbol. For the transform coefficient as discussed in the example above, the symbol may correspond to one of the bits (bins) of the Golomb-Rice code.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure video decoder 300 may receive an entropy encoded value for a current coefficient of a transform block. Video decoder 300 may entropy decode the entropy encoded value to form a Golomb-Rice code representing the value of the current coefficient. Video decoder 300 may calculate a sum of local absolute values of neighboring coefficients to the current coefficient. Video decoder 300 may also calculate a base level offset value, e.g., using equation (1) as discussed below. Video decoder 300 may calculate a normalized value for the sum of absolute values using the base level offset value, e.g., using equation (2) as discussed below. Video decoder 300 may then determine a Rice parameter from the normalized value, e.g., using Table 1 as discussed below. Video decoder 300 may then binarize a value for the current coefficient (e.g., an absolute remainder value) using the Rice parameter and from the Golomb-Rice code. Video decoder 300 may reconstruct the current coefficient from the absolute remainder value and other decoded values for the current coefficient, e.g., a sign value, a significant transform coefficient value, a greater than one value, and a greater than two value.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

FIG. 2 is a conceptual diagram illustrating an example of neighboring coefficients to a current coefficient that may be used to calculate a sum of local absolute values (locSumAbs). In the current design of VVC, a Rice parameter for regular residual coding (RRC) is derived using a look-up table with consideration of coefficient values of neighboring transform coefficients according to a template. The neighboring coefficients shaded grey in FIG. 2 represent the template for the current coefficient shaded black in FIG. 2.

In particular, FIG. 2 depicts current block 130 including various transform coefficients. Current block 130 includes current coefficient 132 and neighboring coefficients 134A-124E (neighboring coefficients 134). Relative to the position of current coefficient 132, neighboring coefficient 134A represents a right-neighboring coefficient, neighboring coefficient 134B represents a two-right-neighboring coefficient, neighboring coefficient 134C represents a below-right-neighboring coefficient, neighboring coefficient 134D represents a below-neighboring coefficient, and neighboring coefficient 134E represents a two-below-neighboring coefficient.

A video coder may calculate a sum of local absolute values (locSumAbs), e.g., the absolute values of neighboring coefficients 134 for current coefficient 132. According to VVC, the video coder calculates a value for locSumAbs as the sum of the absolute values of five available neighboring coefficients as in FIG. 2. Per one example of VVC, the video coder then normalizes the value of locSumAbs (using subtraction and clipping) according to the following equation:

$$locSumAbs = Clip3(0, 31, locSumAbs - baseLevel*5)$$

Then, per VVC, the video coder derives the Rice parameter using the normalized value of locSumAbs using Table 1 below:

TABLE 1

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

In VVC, the Rice parameter range is constrained to be from 0 to 3, inclusive.

In accordance with the techniques of this disclosure, the video coder may calculate a base level offset according to equation (1) as discussed in greater detail below. That is, the video coder may calculate the base level offset value according to a bit depth and/or slice type for a slice including current block 130.

Figure 3:
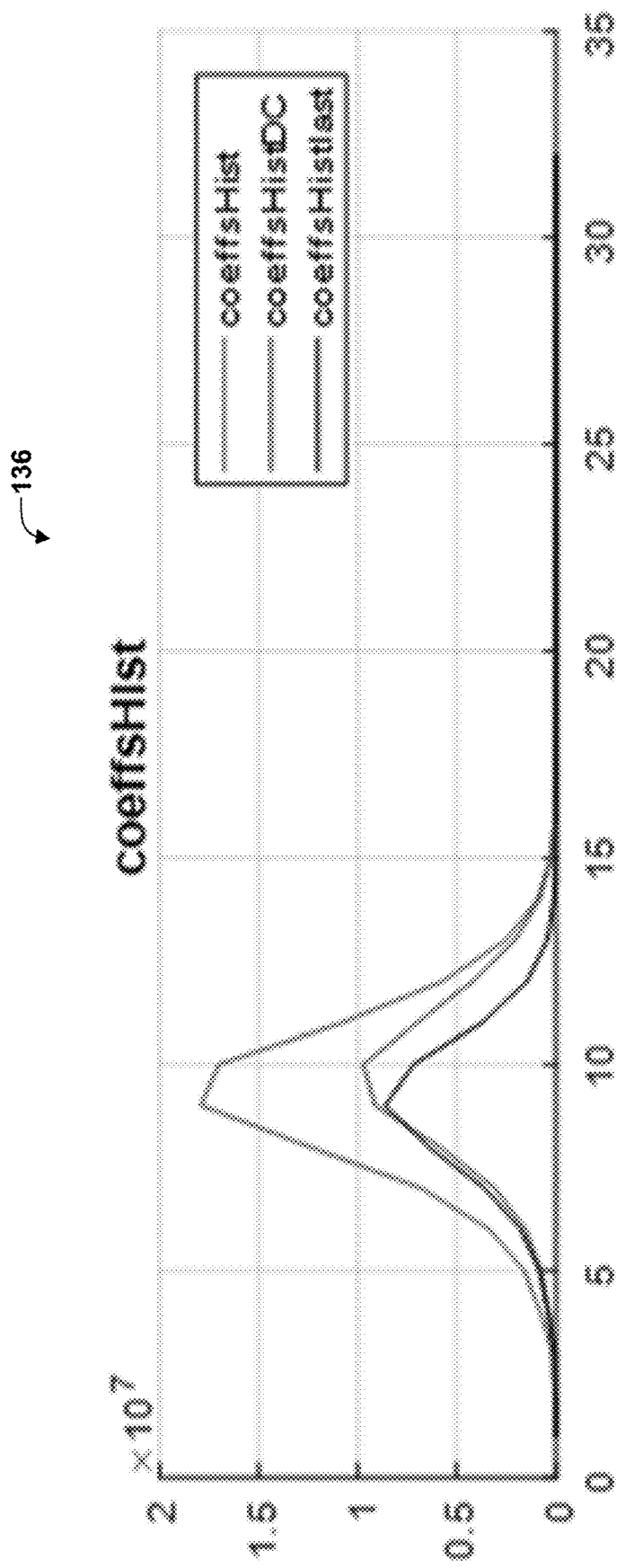
FIG. 3 is a graph illustrating an empirical histogram of coded transform coefficients for a 16-bit test sequence of video data.

FIG. 3 is a graph illustrating an empirical histogram 136 of coded transform coefficients for a 16-bit test sequence of video data.

Figure 4:
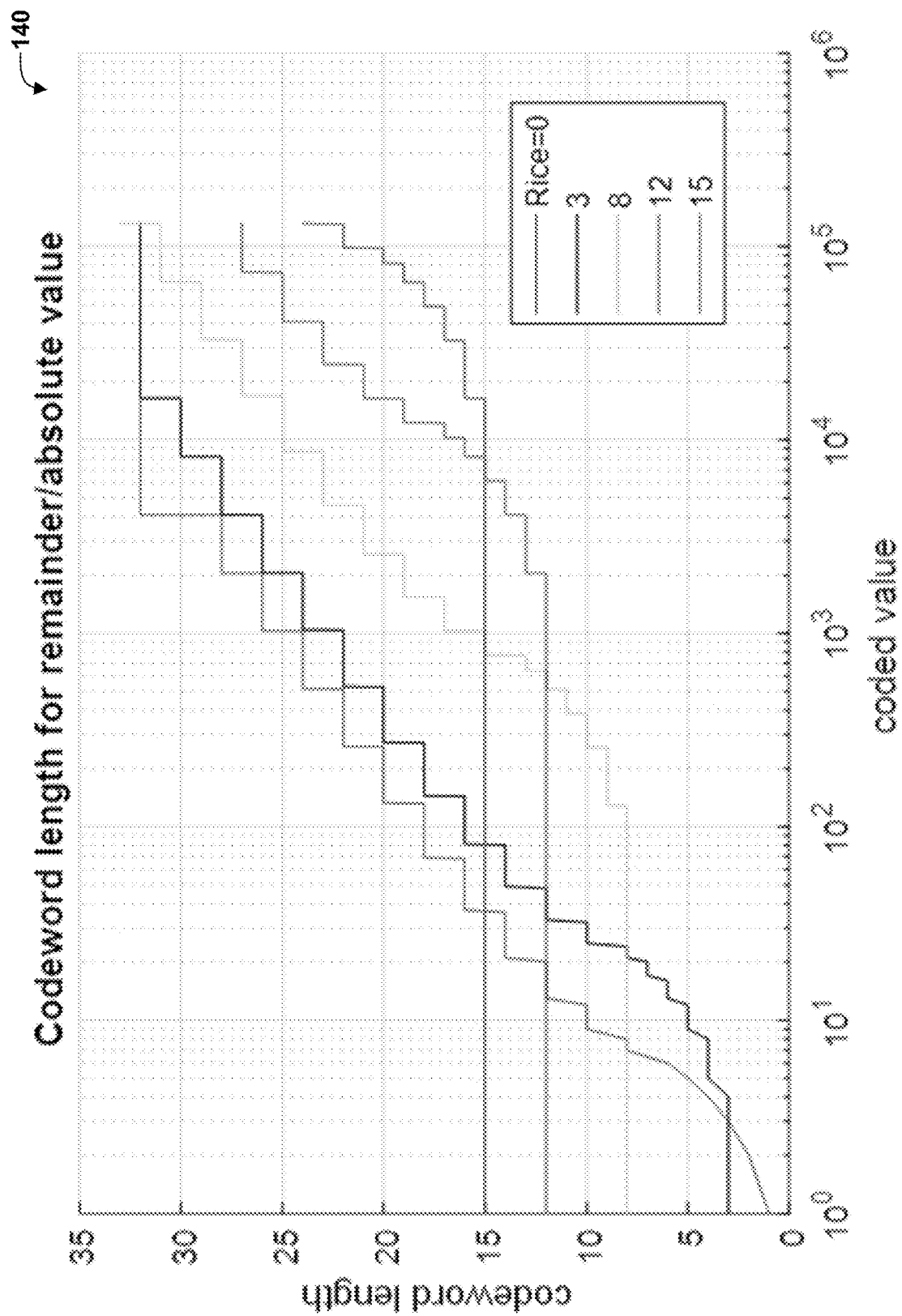
FIG. 4 is a graph illustrating a relationship between codeword lengths produced during entropy coding for coefficient values and given Rice parameters.

FIG. 4 is a graph 140 illustrating a relationship between codeword lengths produced during entropy coding for coefficient values and given Rice parameters.

The Rice parameter has been extensively tested for encoding video sources of 8 bit-depth or 10 bit-depth. In one example design, the Rice parameter value depends on the value of locSumAbs value and is limited to a range from 0 to 3 by clipping. When the bitdepth of the input video is increased, or the extended precision is enabled, or the quantization parameter is set very low, the range of the coefficients, and therefore the locSumAbs value, may significantly increase. In such cases, the current VVC range of allowed Rice parameter is not sufficient, since it would require use of long code words, e.g., codewords of 32 bits, for coded coefficients of large values.

FIGS. 3 and 4 provide visualizations of the problems that may occur as a result. In particular, FIG. 3 shows a histogram of the coded coefficients (in a form of power of 2) for a 16 bit signal. FIG. 4 shows codeword lengths produced by the VVC entropy coding methods for coded values. It can be seen from FIG. 4 that the normative range of Rice parameter being limited to 3 (as defined in VVC) leads to a noticeable increase in a codeword length for coded values greater than 10. This problem may be resolved by allowing a large value of Rice parameter for coefficients of larger magnitude.

In one design (CE1.1 of JVET-U meeting) to address the limitation of the current VVC's Rice parameter derivation in various input bit-depths of video and thus improve compression efficiency, supported range of Rice parameters can be extended from 3 in VVC up to a large number, e.g., 16, which would provide a more efficient binarization process, resulting in a lower number of bits for large values of transform coefficients.

The value of localSumbAbs may be scaled/normalized to handle a bitdepth increase or dynamic range of transform coefficients before being used to derive a Rice parameter, e.g., per equation 1517 of the VVC specification. The amount of the scaling factor may be depended on the value localSumAbs—output of the template derivation computed to indicate local activity of transform coefficients, or syntax element signaled in the bitstream or set of tabulated values.

A VVC video encoder may compare the determined value of localSumAbs against the set of tabulated thresholds Tx={Tid} to identify the dynamical range id for the dynamic range including the value. Then the video coder may scale and/or normalize the value of localSumAbs by a value scalar normShift from a given set of tabulated Rx={Rid} determined by a range id. The video coder may then use the normalized localSumAbs to derive the Rice parameter using a predefined lookup table, e.g., the current look-up table in VVC, Table 128. With the value of localSumbAbs being normalized in the first step of the proposed design, the Rice parameter may be derived from predefined Table, e.g., from Table 128, and finally modified by adding an offset equal to Rid to extend the dynamical range of the Rice parameter range.

The set of thresholds Tx and scaler Rx may be defined as follows:

Tx[8]={32, 128, 512, 2048, 8192, 32768, 131072, 524288};

Rx[9]={0, 2, 4, 6, 8, 10, 12, 14, 16};

The values of the array Tx may be restricted to be power of two, in other embodiments, the values are motivated by power of two ($2^x$) and can be converted to such, through limited number of operations, such as offset, scaling or right/left shift.

The size of the array can be equal to N, where N is a positive integer larger than the lower boundary, e.g., >1 or >2 and less than the upper boundary, e.g., 9 or 5. In some embodiments, the size of Rx array is larger to the array of Tx by 1 entry. In some embodiments, the size of the Tx and Rx arrays can be restricted to 4.

In some examples, the related Rice parameter derivation part in VVC may be modified as follows, with size of the tabulated arrays equal to 4.

```
locSumAbs = 0
if( xC < ( 1 << log2TbWidth ) − 1 ) {
   locSumAbs += AbsLevel[ xC + 1 ][ yC ]
   if( xC < ( 1 << log2TbWidth ) − 2 )
      locSumAbs += AbsLevel[ xC + 2 ][ yC ]
   if( yC < ( 1 << log2TbHeight ) − 1 )
      locSumAbs += AbsLevel[ xC +1 ][ yC + 1 ]         (1517)
}
if( yC < ( 1 << log2TbHeight ) − 1 ) {
   locSumAbs += AbsLevel[ xC ][ yC + 1 ]
   if( yC < ( 1 << log2TbHeight ) − 2 )
      locSumAbs += AbsLevel[ xC ][ yC + 2 ]
}
sum = localSumAbs
 if (sum < g_riceT[0])
   rangeIdx = 0
 else if (sum < g_riceT[1])
   rangeIdx = 1
 else if (sum < g_riceT[2])
   rangeIdx = 2
 else if (sum < g_riceT[3])
   rangeIdx = 3
 else
   rangeIdx = 4
normShift = g_riceShift[rangeIdx]
```

-continued

```
  locSumAbs = locSumAbs >> normShift
  locSumAbs = Clip3( 0, 31, locSumAbs − baseLevel * 5 )
With g_riceT and g_riceShift being defined as follows:
g_riceT[4] = { 32,128, 512, 2048};
g_riceShift[5] = { 0, 2, 4, 6, 8};
Given the variable locSumAbs, the Rice parameter cRiceParam is derived as
specified in Table 128.
cRiceParam is then is refined as:
     cRiceParam = cRiceParam + normShift
```

To extend the range of the Rice parameters, in CE1.2 of U meeting it is proposed to scale values locSumAbs with a shift, if locSumAbs exceed certain threshold, such that scaled value would fit in the allowed range of the Table 128 of the VVC specification without clipping. Following this, an output of the Table 128 is being adjusted by incrementing with shift value if scaling process was taken a place for a given locSumAbs value.

The encoder (e.g., video encoder 200) may select a value for the syntax element sh_scale_rice, which may take values 1 or 2.

scalledCoef=(localSumAbs*sh_scale_rice)>>3 shift=(scalledCoef==0)?0:Floor(Log 2(scalledCoef))

Utilized value sh_scale_rice is signalled as syntax element in the slice header and being derived at the encoder side as a function of QP values.

The specification text for VVC may be as follows:
sps_high_bit_depth equal to 1 specifies that sh_rice_parameter syntax element could be present in slice headers to enable a high bitdepth mode for Rice parameter for the binarization of abs_remaining[ ] and dec_abs_level. sps_high_bit_depth equal to 0 specifies that sh_rice_parameter syntax element is not present in slice headers and high bitdepth mode for Rice parameter derivation cannot be enabled. When not present, the value of sps_high_bit_depth is inferred to be equal to 0.

7.3.7 Slice Header Syntax

```
...
if( sps_dep_quant_enabled_flag )
    sh_dep_quant_used_flag                        u(1)
if( sps_high_bit_depth )
    sh_scale_rice                                 ue(v)
if( sps_sign_data_hiding_enabled_flag &&
    !sh_dep_quant_used_flag )
    sh_sign_data_hiding_used_flag                 u(1)
``` sh_scale_rice specifies the scale value utilized for derivation of the Rice parameter, the value of sh_scale_rice shall be in the range of 1 to 2, inclusive. When sh_scale_rice is not present, it is inferred to be equal to 0.

```
locSumAbs = 0
if( xC < ( 1 << log2TbWidth ) − 1 ) {
  locSumAbs += AbsLevel[ xC + 1 ][ yC ]
  if( xC < ( 1 << log2TbWidth ) − 2 )
    locSumAbs += AbsLevel[ xC + 2 ][ yC ]
  if( yC < ( 1 << log2TbHeight ) − 1 )
    locSumAbs += AbsLevel[ xC + 1 ][ yC + 1 ]          (1517)
}
if( yC < ( 1 << log2TbHeight ) − 1 ) {
  locSumAbs += AbsLevel[ xC ][ yC + 1 ]
  if( yC < ( 1 << log2TbHeight ) − 2 )
    locSumAbs += AbsLevel[ xC ][ yC + 2 ]
}
Variable shift is derived as follows:
scalledCoef = (localSumAbs * sh_scale_rice) >> 3
shift = (scalledCoef == 0) ? 0 : Floor( Log2( scalledCoef) )
locSumAbs = locSumAbs >> shift
Variable localSumAbs is updated as follows:
locSumAbs = Clip3( 0, 31, locSumAbs − baseLevel * 5 )
Given the variable locSumAbs, the Rice parameter cRiceParam is derived as specified in Table 128.
cRiceParam is then is refined as:
    cRiceParam = cRiceParam + shift
```

The RRC method discussed above may be extended with a history of Rice parameters used, as discussed below:

A single counter per color component is utilized, StatCoeff[3] is being updated once per TU from the first, non-zero, Golomb-Rice coded transform coefficient (abs_remainder[ ] or dec_abs_level[ ]).

When first, non-zero, Golomb-Rice coded transform coefficient in TU is coded as abs_remainder, a history counter (StatCoeff) for color component cIdx is updated as follows:

StatCoeff[cIdx](StatCoeff[cIdx]+Floor(Log 2(abs_remainder[ ]))+2)>>1

When first, non-zero, Golomb-Rice coded transform coefficient in TU is coded as abs_remainder, the history counter for color component cIdx is updated as follows:

StatCoeff[cIdx]=(StatCoeff[cIdx]+Floor(Log 2(dec_abs_level[ ])))>>1

History counter StatCoeff[3] can be reset at the CTU level with a default value, or history can be propagated between different CTUs.

History Rice parameter value is utilized in the template derivation, clause 9.3.3.2 Implementation of this method is shown VVC specification text extract for clause 9.3.3.2, with text highlighted with green is related to changes from CE-1.2 and yellow highlighted text associated with classification utilized in CE-1.4. Variable g_historyValue is derived prior to coding of current TU from history counter associated with current color component id.

histValue=1<<StatCoeff[cIdx]

input signal bit depth and/or slice type, and use the baseLevel offset value to scale the locSumAbs value, as shown below.

In some examples, video encoder 200 and video decoder 300 may derive baseLevelOffset, as follows:

baseLevelOffset=(bitDepth>*T*)?(isIntra( )?*P*1:*P*2):(isIntra( )?*P*3:*P*4)    (1)

In equation (1), the question mark operator (?) expresses an equation in the form of <condition>?X:Y, where if <condition> is true, the value of X is returned, but if <condition> is false, the value of Y is returned. The baseLevelOffset value represents the base level offset, bitDepth represents the bit depth of the video bitstream, T is a threshold, and P1, P2, P3, and P4 are values that may be predetermined or signaled in the bitstream.

Video encoder 200 and video decoder 300 may use the base level offset value to normalize localSumAbs, as follows:

locSumAbs=Clip3(0,31,locSumAbs−baseLevelOffset)    (2)

In general, T represents a threshold value, and the P1, P2, P3, and P4 values represent integer values. In some examples, T=12, P1=5, P2=10, P3=6, P4=20. In some examples, T=12, P1=5, P2=10, P3=10, P4=20. Other values for T, P1, P2, P3, and P4 may also be used. T, P1, P2, P3, and P4 may be pre-defined, signaled in the bitstream, or derived based on various criteria.

In some examples, for the history-based Rice derivation techniques discussed above, video encoder 200 and video

```
locSumAbs = 0
if( xC < ( 1 << log2TbWidth ) − 1 ) {
   locSumAbs += AbsLevel[ xC + 1 ][ yC ]
   if( xC < ( 1 << log2TbWidth ) − 2 )
      locSumAbs += AbsLevel[ xC + 2 ][ yC ]
   else
      locSumAbs += histValue
   if( yC < ( 1 << log2TbHeight ) − 1 )
      locSumAbs += AbsLevel[ xC + 1 ][ yC + 1 ]           (1517)
   else
      locSumAbs += histValue
}
else
   locSumAbs += 2 * histValue
if( yC < ( 1 << log2TbHeight ) − 1 ) {
   locSumAbs += AbsLevel[ xC ][ yC + 1 ]
   if( yC < ( 1 << log2TbHeight ) − 2 )
      locSumAbs += AbsLevel[ xC ][ yC + 2 ]
   else
      locSumAbs += histValue
}
else
   locSumAbs += histValue
Variable shift is derived as follows:
scalledCoef = (localSumAbs * ScaleRice) >> 3
shift = (scalledCoef == 0) ? 0 : Floor( Log2( scalledCoef ) )
locSumAbs = locSumAbs >> shift
Variable localSumAbs is updated as follows:
locSumAbs = Clip3( 0, 31, locSumAbs − baseLevel * 5 )
Given the variable locSumAbs, the Rice parameter cRiceParam is derived as
specified in Table 128.
cRiceParam is then is refined as:
     cRiceParam = cRiceParam + shift
```

Video encoder 200 and video decoder 300 may be configured according to the techniques of this disclosure as discussed below. These techniques include revisions to the techniques discussed above.

In some examples, for the local-based Rice derivation techniques discussed above, video encoder 200 and video decoder 300 may derive a base level offset as a function of decoder 300 may preserve the status of history counters StatCoeff[cIdx] between certain blocks (e.g., certain CTUs). Additionally or alternatively, video encoder 200 and video decoder 300 may derive a ScaleRice parameter (which replaces the explicitly signaled sh_scale_rice syntax element) at a block level, e.g., CTU level, from the current status of the StatCoeff[ ] counter. Thus, video encoder 200 and video decoder 300 do not need to explicitly signal the sh_rice_init syntax element.

In some examples, video encoder 200 and video decoder 300 may derive the ScaleRice parameter value through comparing the status of the StatCoeff[ ] against a threshold and specifying an integer value of the parameter in the range of integer values. One such example of the derivation is shown below:

ScaleRice=(StatCoeff[idx]>=T)?P2:P1;

In some examples, T=4, P2=2 and P1=1.

In some examples, video encoder 200 and video decoder 300 may derive the parameter ScaleRice independently for each color component (e.g., luma, blue hue chroma, and red hue chroma).

In some examples, video encoder 200 and video decoder 300 may, when deriving the value for the ScaleRice parameter, take into consideration values for history counters for two or more (e.g., all) color components through an aggregation function, e.g., a weighted function across color components, as shown below:

StatCoefAverage=((StatCoeff[0]*w0)+
  StatCoeff[1]*w1+StatCoeff[2]*w2)/(w1+w2+
  w3);

ScaleRice=(StatCoefAverage>=T)?P2:P1;

In some examples, w0=2, w1=1, w2=1;

In some examples, video encoder 200 and video decoder 300 may derive the parameter ScaleRice at a block level, e.g., at the level of CTUs, TUs, or sub-TU. Video encoder 200 and video decoder 300 may use the ScaleRice parameter when decoding data of a subsequently coded block of data. Alternatively, video encoder 200 and video decoder 300 may use the derived ScaleRice value in a delayed manner by some block size, e.g., for decoding a block after the next block.

Thus, a check for if(sps_high_bit_depth) and the sh_scale_rice syntax element can be removed from a syntax table.

In some examples, video encoder 200 and video decoder 300 may derive the ScaleRice value through the process described above following the initialization of the StatCoeff with default or signalled values.

Figure 5:
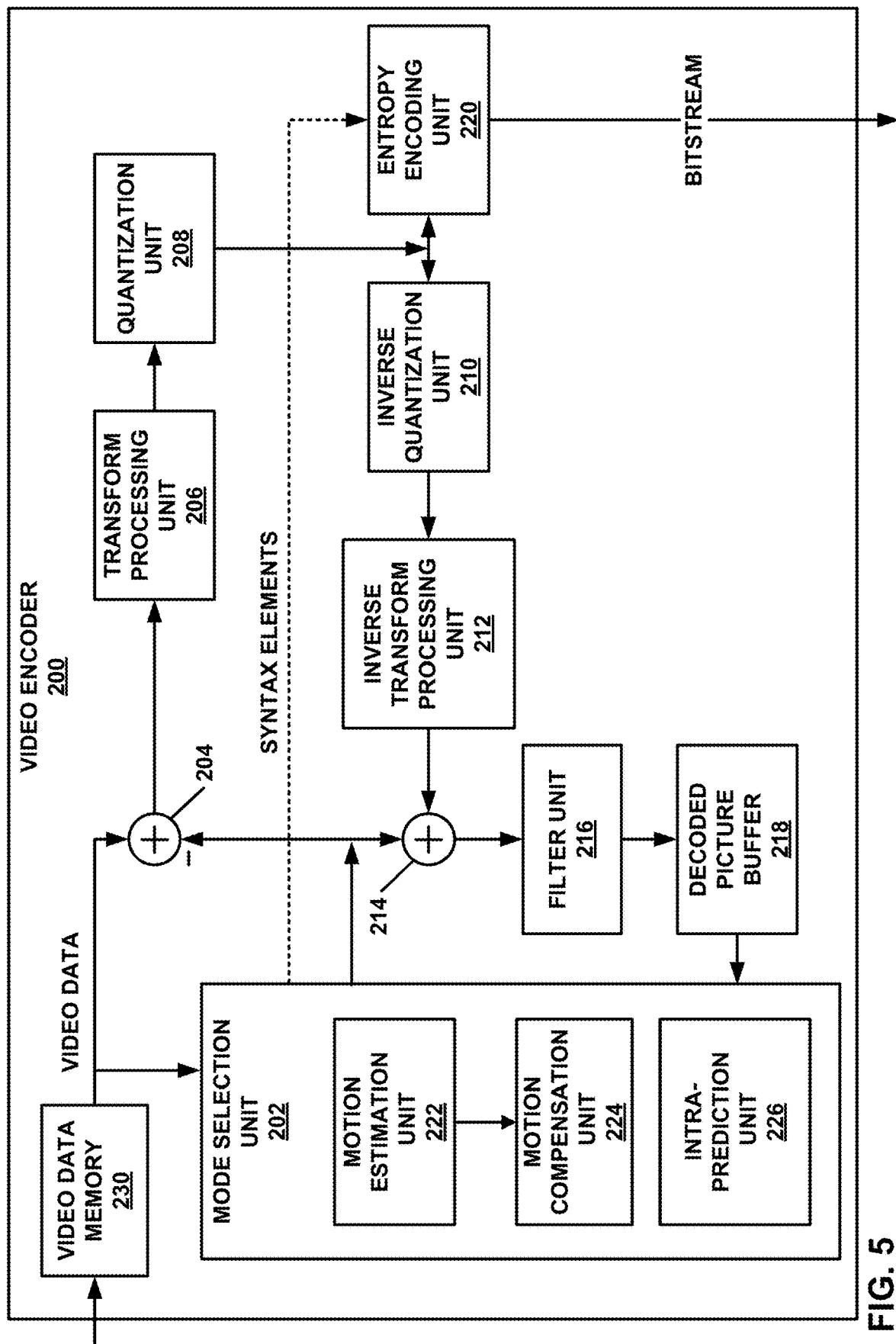
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable non-linear low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

In some examples, entropy encoding unit 220 may be configured to apply any or all of the Rice parameter derivation techniques discussed in this disclosure when entropy encoding video data, e.g., values for one or more syntax elements of transform coefficients. For example, entropy encoding unit 220 may receive a transform block from quantization unit 208. For each coefficient in the transform block, entropy encoding unit 220 may encode values for one or more of a significant transform coefficient syntax element, a greater than 1 syntax element, a greater than 2 syntax element, a sign syntax element, and a remainder value.

When entropy encoding the remainder value (or a dec_abs_remainder value), among other values, entropy encoding unit 220 may initially calculate a local sum of absolute values value as a sum of absolute values of neighboring coefficients to a current coefficient, e.g., as discussed above with respect to FIG. 2. Entropy encoding unit 220 may then calculate a base level offset value according to a bit depth and/or a slice type for a slice including the current block, e.g., per equation (1) above. Entropy encoding unit 220 may calculate a normalized value for the local sum of absolute values value using the base level offset value, e.g., per equation (2) above. Entropy encoding unit 220 may then calculate a Rice parameter from the normalized value, e.g., per Table 1 above. Entropy encoding unit 220 may then determine a Golomb-Rice code for the remainder value using the Rice parameter and entropy encode each bit (bin) of the Golomb-Rice code.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In this manner, video encoder 200 represents an example of a device for encoding (and decoding) video data, the device including a memory configured to store video data; and one or more processors implemented in circuitry and configured to: calculate a sum of absolute values of a plurality of neighboring coefficients to a current coefficient for a current block of video data; calculate a base level offset value according to at least one of a bit depth for the video data or a slice type for a slice including the current block; calculate a normalized value for the sum of absolute values using the base level offset value; and code the current coefficient using the normalized value for the sum of absolute values.

Figure 6:
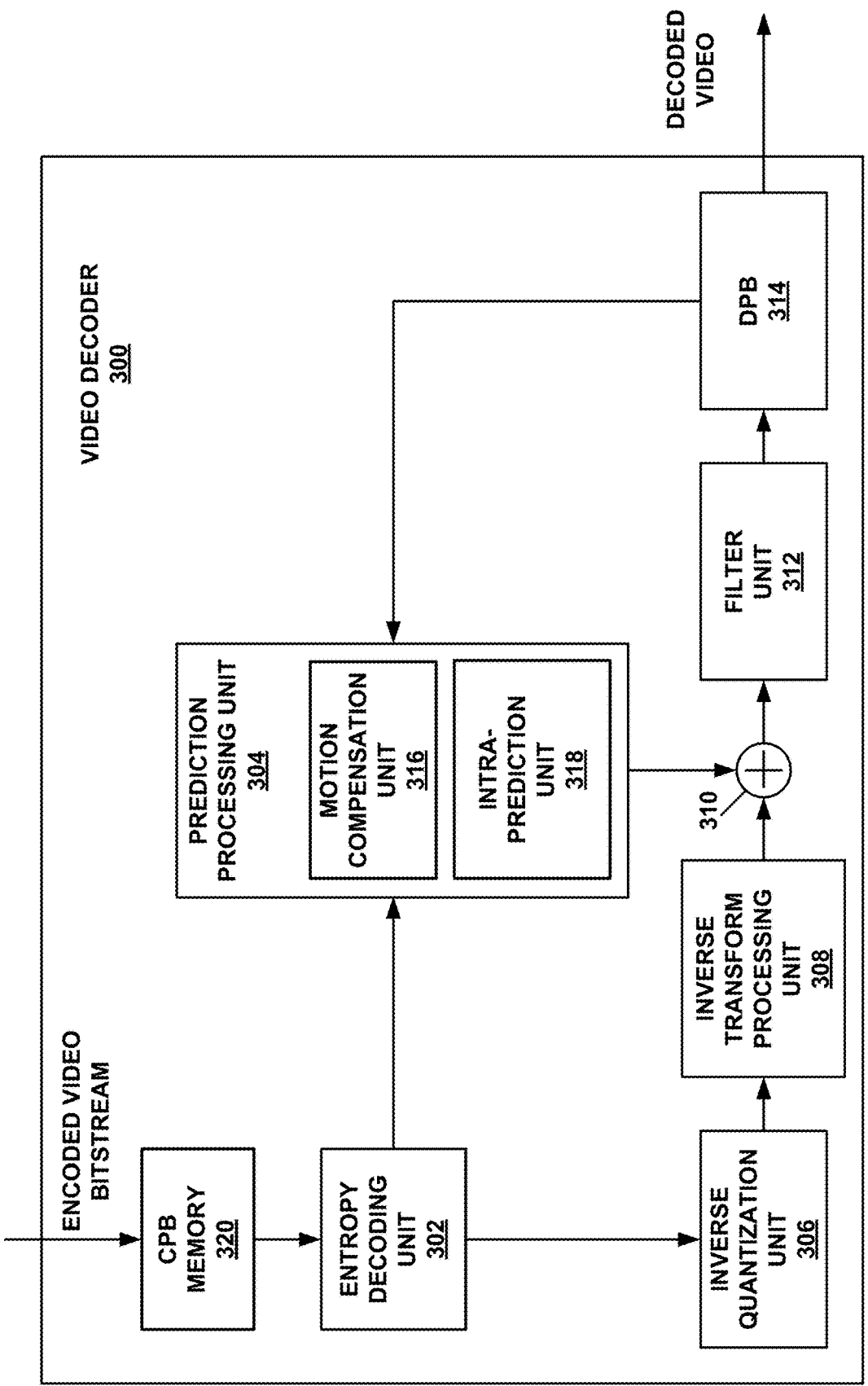
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In some examples, entropy decoding unit 302 may be configured to apply any or all of the Rice parameter derivation techniques discussed in this disclosure when entropy decoding video data, e.g., values for one or more syntax elements of transform coefficients. For example, entropy decoding unit 302 may receive entropy encoded values for one or more of a significant transform coefficient syntax element, a greater than 1 syntax element, a greater than 2 syntax element, a sign syntax element, and a remainder value.

When decoding the remainder value (or a dec_abs_remainder value) for a current coefficient, among other values, entropy decoding unit 302 may entropy decode a Golomb-Rice code from the bitstream for the remainder value of the current coefficient. Entropy decoding unit 302 may then calculate a local sum of absolute values value as a sum of absolute values of neighboring coefficients to the current coefficient, e.g., as discussed above with respect to FIG. 2. Entropy decoding unit 302 may then calculate a base level offset value according to a bit depth and/or a slice type for a slice including the current block, e.g., per equation (1) above. Entropy decoding unit 302 may calculate a normalized value for the local sum of absolute values value using the base level offset value, e.g., per equation (2) above. Entropy decoding unit 302 may then calculate a Rice parameter from the normalized value, e.g., per Table 1 above. Entropy decoding unit 302 may then binarize the remainder value from the Golomb-Rice code using the Rice parameter. Entropy decoding unit 302 may concatenate the significant coefficient value, the greater than 1 value, the greater than 2 value, and the remainder value to reconstruct the current coefficient.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a device for decoding video data, the device including a memory configured to store video data; and one or more processors implemented in circuitry and configured to: calculate a sum of absolute values of a plurality of neighboring coefficients to a current coefficient for a current block of video data; calculate a base level offset value according to at least one of a bit depth for the video data or a slice type for a slice including the current block; calculate a normalized value for the sum of absolute values using the base level offset value; and code the current coefficient using the normalized value for the sum of absolute values.

Figure 7:
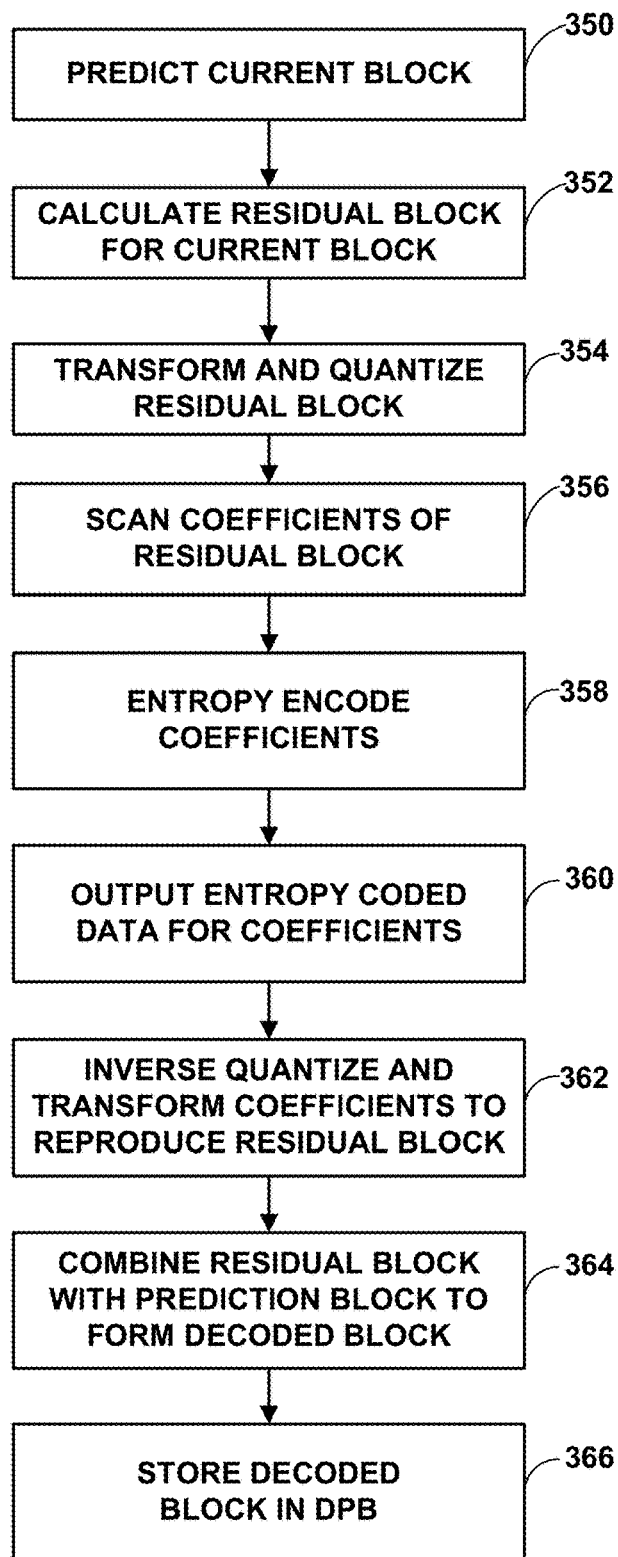
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may comprise a current CU. Although described with respect to video encoder 200 (FIGS. 1 and 5), it should be understood that other devices may be configured to perform a method similar to that of FIG. 7.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may apply any or all of the Rice parameter derivation techniques discussed in this disclosure when entropy encoding the transform coefficients. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 8:
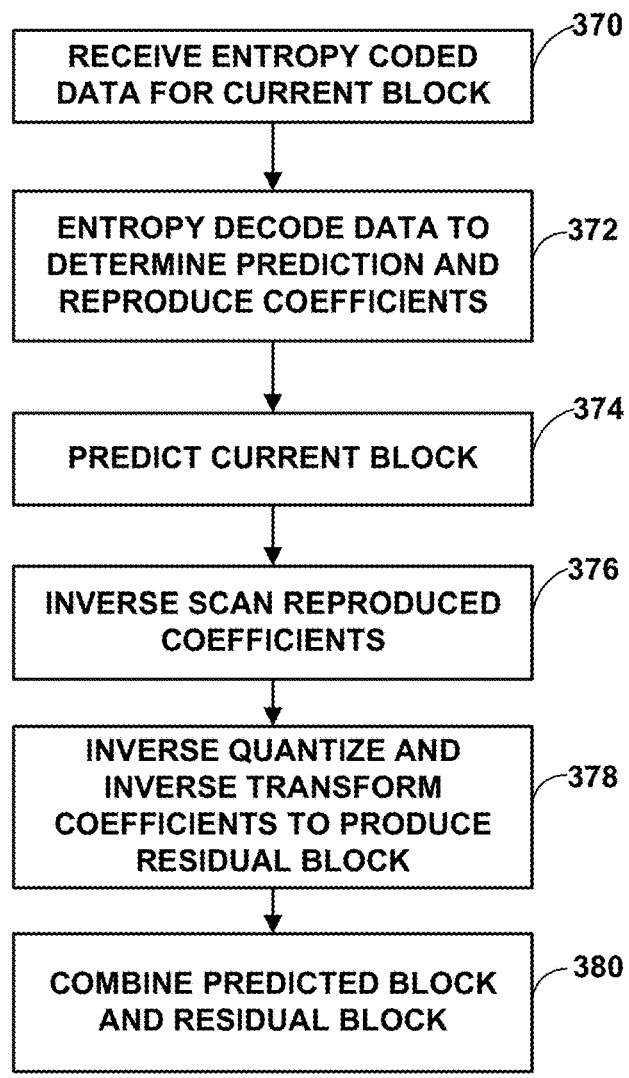
FIG. 8 is a flowchart illustrating an example method for decoding a current block in accordance with the techniques of this disclosure.

FIG. 8 is a flowchart illustrating an example method for decoding a current block of video data in accordance with the techniques of this disclosure. The current block may comprise a current CU. Although described with respect to video decoder 300 (FIGS. 1 and 6), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may apply any or all of the Rice parameter derivation techniques discussed in this disclosure when entropy decoding the transform coefficients.

Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 9:
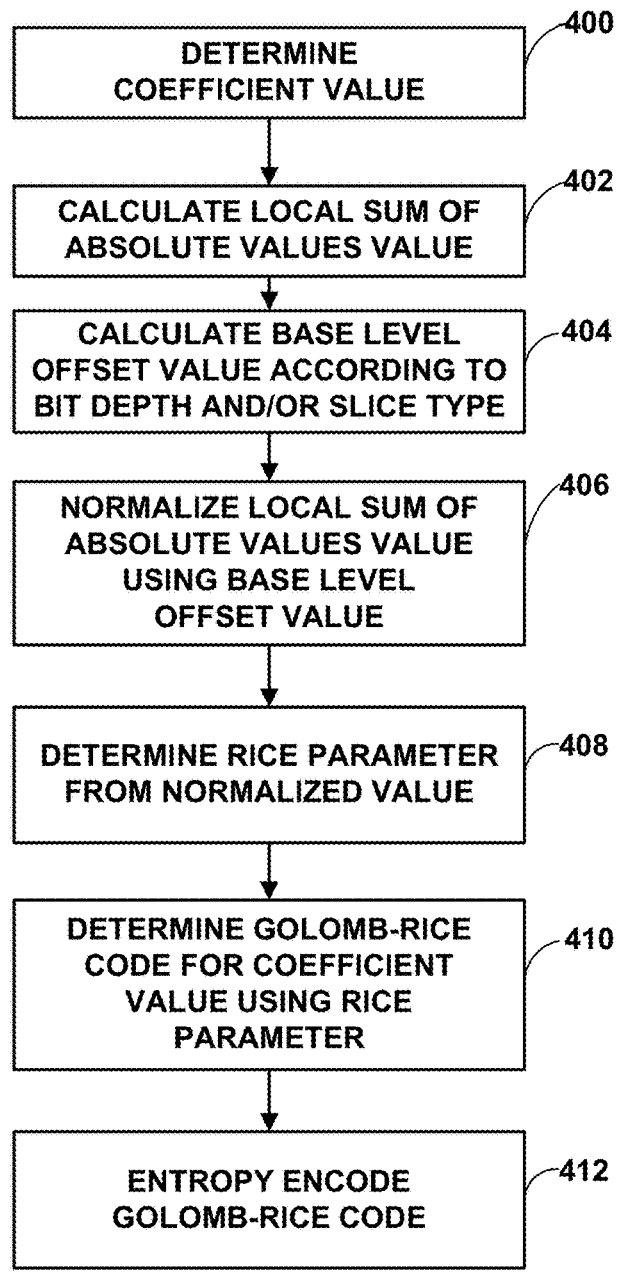
FIG. 9 is a flowchart illustrating an example method of encoding video data according to the techniques of this disclosure.

FIG. 9 is a flowchart illustrating an example method of encoding video data according to the techniques of this disclosure. The method of FIG. 9 may generally correspond to step 358 of FIG. 7.

Initially, video encoder 200 may determine a current coefficient value (400) of a current block of video data. Video encoder 200 may partition the current coefficient value into respective values for syntax elements, such as a significant coefficient syntax element, a greater than 1 syntax element, a greater than 2 syntax element, a remainder syntax element, and a sign syntax element. The method of FIG. 9 describes encoding of the value of the remainder syntax element. However, other syntax elements, such as the dec_abs_level[ ] syntax element, may be encoded using this or a similar method.

Video encoder 200 may then calculate a local sum of absolute values value (402). For example, video encoder 200 may determine absolute values for values of neighboring coefficients to the current coefficient. With respect to the example of FIG. 2, for example, the neighboring coefficients may include a right-neighboring coefficient, a two-right-neighboring coefficient, a bottom-right neighboring coefficient, a bottom neighboring coefficient, and a two-bottom-neighboring coefficient. Video encoder 200 may add a total sum of the absolute values of the neighboring coefficients as the local sum of absolute values value.

Video encoder 200 may then calculate a base level offset value according to a bit depth and/or a slice type for a slice including the current block (404). For example, video encoder 200 may calculate the base level offset value (baseLevelOffset) according to:

baseLevelOffset=(bitDepth>$T$)?(isIntra( )?$P1$:$P2$):
(isIntra( )?$P3$:$P4$).

Thus, video encoder 200 may determine whether the bit depth (bitDepth) for the video data is greater than a threshold value T. If the bit depth is greater than the threshold value, video encoder 200 may determine whether the slice type is intra-prediction. If the slice type is intra-prediction, video encoder 200 may determine that the base level offset value is P1. If the slice type is not intra-prediction (e.g., is inter-prediction, such as a P-slice or a B-slice), video encoder 200 may determine that the base level offset value is P2. If the bit depth is less than or equal to the threshold, video encoder 200 may also determine whether the slice type is intra-prediction. If the slice type is intra-prediction, video encoder 200 may determine that the base level offset value is P3. If the slice type is not intra-prediction (e.g., is inter-prediction, such as a P-slice or a B-slice), video encoder 200 may determine that the base level offset value is P4. P1, P2, P3, and P4 may be pre-defined values, or video encoder 200 may determine values for P1, P2, P3, and P4 and signal the determined values in the bitstream.

Video encoder 200 may then normalize the local sum of absolute values using the calculated base level offset value (406). For example, video encoder 200 may calculate:

locSumAbs=Clip3(0,31,locSumAbs−baseLevelOffset).

In this example, locSumAbs (the local sum of absolute values) is updated using the clipping operation Clip3 per, e.g., VVC, and using the calculated baseLevelOffset value.

Video encoder 200 may then determine a Rice parameter from the normalized value (408). For example, video encoder 200 may determine the Rice parameter using Table 1 as a look-up table.

Video encoder 200 may then determine a Golomb-Rice code for the coefficient value (e.g., the remainder value) using the Rice parameter (410). The Golomb-Rice code may be a series of bits (bins). Video encoder 200 may then entropy encode the Golomb-Rice code (412).

In this manner, the method of FIG. 9 represents an example of a method of encoding video data including: calculating a sum of absolute values of a plurality of neighboring coefficients to a current coefficient for a current block of video data; calculating a base level offset value according to at least one of a bit depth for the video data or a slice type for a slice including the current block; calculating a normalized value for the sum of absolute values using the base level offset value; and coding the current coefficient using the normalized value for the sum of absolute values.

Figure 10:
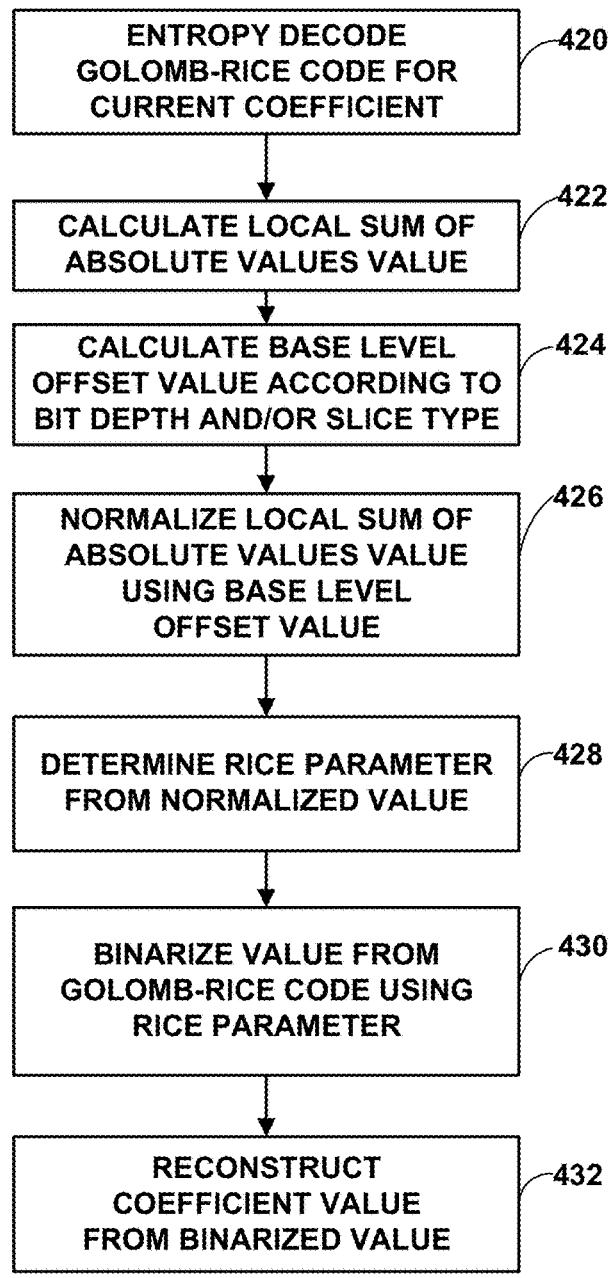
FIG. 10 is a flowchart illustrating an example method of decoding video data according to the techniques of this disclosure.

FIG. 10 is a flowchart illustrating an example method of decoding video data according to the techniques of this disclosure. The method of FIG. 10 may generally correspond to step 372 of FIG. 8.

Initially, video decoder 300 may entropy decode a Golomb-Rice code for a current coefficient (420) of a current block of video data. The Golomb-Rice code may correspond to a residual value of the current coefficient, and the current coefficient may further include a significant coefficient syntax element, a greater than 1 syntax element, a greater than 2 syntax element, and a sign syntax element. While the example of FIG. 10 is directed to decoding a remainder value for a current coefficient, the method of FIG. 10 may also be used to decode other values, such as a value for a dec_abs_level[ ] syntax element.

Video decoder 300 may then calculate a local sum of absolute values value (422). For example, video decoder 300 may determine absolute values for values of neighboring coefficients to the current coefficient. With respect to the example of FIG. 2, for example, the neighboring coefficients may include a right-neighboring coefficient, a two-right-neighboring coefficient, a bottom-right neighboring coefficient, a bottom neighboring coefficient, and a two-bottom-neighboring coefficient. Video decoder 300 may add a total sum of the absolute values of the neighboring coefficients as the local sum of absolute values value.

Video decoder 300 may then calculate a base level offset value according to a bit depth and/or a slice type for a slice including the current block (424). For example, video decoder 300 may calculate the base level offset value (baseLevelOffset) according to:

baseLevelOffset=(bitDepth>T)?(isIntra( )?P1:P2):(isIntra( )?P3:P4).

Thus, video decoder 300 may determine whether the bit depth (bitDepth) for the video data is greater than a threshold value T. If the bit depth is greater than the threshold value, video decoder 300 may determine whether the slice type is intra-prediction. If the slice type is intra-prediction, video decoder 300 may determine that the base level offset value is P1. If the slice type is not intra-prediction (e.g., is inter-prediction, such as a P-slice or a B-slice), video decoder 300 may determine that the base level offset value is P2. If the bit depth is less than or equal to the threshold, video decoder 300 may also determine whether the slice type is intra-prediction. If the slice type is intra-prediction, video decoder 300 may determine that the base level offset value is P3. If the slice type is not intra-prediction (e.g., is inter-prediction, such as a P-slice or a B-slice), video decoder 300 may determine that the base level offset value is P4. P1, P2, P3, and P4 may be pre-defined values, or video decoder 300 may decode values for P1, P2, P3, and P4 from the bitstream.

Video decoder 300 may then normalize the local sum of absolute values using the calculated base level offset value (426). For example, video decoder 300 may calculate:

locSumAbs=Clip3(0,31,locSumAbs−baseLevelOffset).

In this example, locSumAbs (the local sum of absolute values) is updated using the clipping operation Clip3 per, e.g., VVC, and using the calculated baseLevelOffset value.

Video decoder 300 may then determine a Rice parameter from the normalized value (428). For example, video decoder 300 may determine the Rice parameter using Table 1 as a look-up table.

Video decoder 300 may then form a binarized (binary) value representing the remainder value from the Golomb-Rice code using the Rice parameter (430). Video decoder 300 may further reconstruct the coefficient value from the binarized value (432). For example, video decoder 300 may concatenate the values for the significant coefficient syntax element, the greater than 1 syntax element, the greater than 2 syntax element, and the remainder value.

In this manner, the method of FIG. 9 represents an example of a method of decoding video data including: calculating a sum of absolute values of a plurality of neighboring coefficients to a current coefficient for a current block of video data; calculating a base level offset value according to at least one of a bit depth for the video data or a slice type for a slice including the current block; calculating a normalized value for the sum of absolute values using the base level offset value; and coding the current coefficient using the normalized value for the sum of absolute values.

Certain examples of various techniques of this disclosure are summarized in the following clauses:

Clause 1: A method of coding video data, the method comprising: calculating a sum of absolute values of a plurality of neighboring coefficients to a current coefficient for a current block of video data; calculating a base level offset value according to at least one of a bit depth for the video data or a slice type for a slice including the current block; calculating a normalized value for the sum of absolute values using the base level offset value; and coding the current coefficient using the normalized value for the sum of absolute values.

Clause 2: The method of clause 1, wherein the plurality of neighboring coefficients includes five neighboring coefficients to the current coefficient.

Clause 3: The method of any of clauses 1 and 2, wherein the plurality of neighboring coefficients includes two right-neighboring coefficients to the current coefficient, two below-neighboring coefficients to the current coefficient, and one below-left neighboring coefficient to the current coefficient.

Clause 4: The method of any of clauses 1-3, wherein calculating the base level offset value comprises calculating baseLevelOffset=(bitDepth>T)?(isIntra( )?P1:P2):(isIntra( )?P3:P4), wherein bitDepth comprises the bit depth for the video data, isIntra( ) returns a value of true if the slice type for the slice is an intra-predicted slice or false if the slice type for the slice is an inter-predicted slice, and T, P1, P2, P3, and P4 comprise respective input values.

Clause 5: The method of clause 4, wherein the input values for T, P1, P2, P3, and P4 are predetermined.

Clause 6: The method of clause 4, wherein the input values for T, P1, P2, P3, and P4 are signaled in the bitstream.

Clause 7: The method of any of clauses 4-6, wherein T=12, P1=5, P2=10, P3=6, P4=20.

Clause 8: The method of any of clauses 4-6, wherein T=12, P1=5, P2=10, P3=10, P4=20.

Clause 9: The method of any of clauses 1-8, wherein calculating the normalized value for the sum of absolute values comprises calculating Clip3(0, 31, locSumAbs−baseLevelOffset), wherein locSumAbs comprises the sum of absolute values and baseLevelOffset comprises the base level offset value.

Clause 10: A method of coding video data, the method comprising: maintaining a history counter representing a history of Rice parameters used to code coefficients of a color component of video data; deriving a Rice parameter scaling value for a block of the color component of the video data from a current value for the history counter, without explicitly coding a value for the Rice parameter scaling value; calculating a sum of absolute values of a plurality of neighboring coefficients to a current coefficient of the block; calculating a scaled value for the sum of absolute values using the Rice parameter scaling value; and coding the current coefficient using the scaled value for the sum of absolute values.

Clause 11: A method comprising a combination of the method of any of clauses 1-9 and the method of clause 10.

Clause 12: The method of any of clauses 10 and 11, wherein deriving the Rice parameter scaling value comprises calculating (StatCoeff[idx]>=T)?P2:P1, wherein idx represents the color component, StatCoeff[idx] represents the current value for the history counter, and T, P1, and P2 represent input values.

Clause 13: The method of clause 12, wherein the input values for T, P1, and P2 are predetermined.

Clause 14: The method of clause 12, wherein the input values for T, P1, and P2 are signaled in the video data.

Clause 15: The method of any of clauses 12-14, wherein T=4, P2=2 and P1=1.

Clause 16: The method of any of clauses 10 and 11, wherein deriving the Rice parameter scaling value comprises: calculating an aggregated history counter value representing an aggregation of history counters, including the history counter, for all color components, including the color component, of the video data; and deriving the Rice parameter scaling value using the aggregated history counter value.

Clause 17: The method of clause 16, wherein calculating the aggregated history counter value comprises calculating ((StatCoeff[0]*w0)+StatCoeff[1]*w1+StatCoeff[2]*w2)/(w1+w2+w3), wherein StatCoeff[0] represents a first history counter of the history counters for a first color component of the color components, StatCoeff[1] represents a second history counter of the history counters for a second color component of the color components, StatCoeff[2] represents a third history counter of the history counters for a third color component of the color components, and w1, w2, and w3 represent respective weighting values.

Clause 18: The method of clause 17, wherein deriving the Rice parameter scaling value comprises deriving the Rice parameter scaling value using (StatCoefAverage>=T)?P2:P1, wherein StatCoefAverage represents the aggregated history counter value and T, P1, and P2 represent input values.

Clause 19: The method of clause 18, wherein the input values for T, P1, and P2 are predetermined.

Clause 20: The method of clause 18, wherein the input values for T, P1, and P2 are signaled in the video data.

Clause 21: The method of any of clauses 18-20, wherein T=4, P2=2 and P1=1.

Clause 22: The method of any of clauses 18-21, wherein w0=2, w1=1, and w2=1.

Clause 23: The method of any of clauses 10-22, wherein the block comprises a coding tree unit (CTU).

Clause 24: The method of any of clauses 10-22, wherein the block comprises a transform unit (TU).

Clause 25: The method of any of clauses 10-22, wherein the block comprises a sub-transform unit (sub-TU).

Clause 26: The method of any of clauses 10-22, wherein the block comprises a first block and the Rice parameter scaling value comprises a first Rice parameter scaling value, the method further comprising deriving a second Rice parameter scaling value for a second block using the first Rice parameter scaling value.

Clause 27: A method of coding video data, the method comprising: calculating a sum of absolute values of a plurality of neighboring coefficients to a current coefficient for a current block of video data; calculating a base level offset value according to at least one of a bit depth for the video data or a slice type for a slice including the current block; calculating a normalized value for the sum of absolute values using the base level offset value; and coding the current coefficient using the normalized value for the sum of absolute values.

Clause 28: The method of clause 27, wherein the plurality of neighboring coefficients includes five neighboring coefficients to the current coefficient.

Clause 29: The method of clause 27, wherein the plurality of neighboring coefficients includes two right-neighboring coefficients to the current coefficient, two below-neighboring coefficients to the current coefficient, and one below-left neighboring coefficient to the current coefficient.

Clause 30: The method of clause 27, wherein calculating the base level offset value comprises calculating baseLevelOffset=(bitDepth>T)?(isIntra( )?P1:P2) (isIntra( )?P3:P4), wherein bitDepth comprises the bit depth for the video data, isIntra( ) returns a value of true if the slice type for the slice is an intra-predicted slice or false if the slice type for the slice is an inter-predicted slice, and T, P1, P2, P3, and P4 comprise respective input values.

Clause 31: The method of clause 30, wherein the input values for T, P1, P2, P3, and P4 are predetermined.

Clause 32: The method of clause 30, wherein the input values for T, P1, P2, P3, and P4 are signaled in the bitstream.

Clause 33: The method of clause 30, wherein T=12, P1=5, P2=10, P3=6, P4=20.

Clause 34: The method of clause 30, wherein T=12, P1=5, P2=10, P3=10, P4=20.

Clause 35: The method of clause 27, wherein calculating the normalized value for the sum of absolute values comprises calculating Clip3(0, 31, locSumAbs−baseLevelOffset), wherein locSumAbs comprises the sum of absolute values and baseLevelOffset comprises the base level offset value.

Clause 36: A method of coding video data, the method comprising: maintaining a history counter representing a history of Rice parameters used to code coefficients of a color component of video data; deriving a Rice parameter scaling value for a block of the color component of the video data from a current value for the history counter, without explicitly coding a value for the Rice parameter scaling value; calculating a sum of absolute values of a plurality of neighboring coefficients to a current coefficient of the block; calculating a scaled value for the sum of absolute values using the Rice parameter scaling value; and coding the current coefficient using the scaled value for the sum of absolute values.

Clause 37: The method of clause 36, wherein deriving the Rice parameter scaling value comprises calculating (StatCoeff[idx]>=T)?P2:P1, wherein idx represents the color component, StatCoeff[idx] represents the current value for the history counter, and T, P1, and P2 represent input values.

Clause 38: The method of clause 37, wherein the input values for T, P1, and P2 are predetermined.

Clause 39: The method of clause 37, wherein the input values for T, P1, and P2 are signaled in the video data.

Clause 40: The method of clause 37, wherein T=4, P2=2 and P1=1.

Clause 41: The method of clause 36, wherein deriving the Rice parameter scaling value comprises: calculating an aggregated history counter value representing an aggregation of history counters, including the history counter, for all color components, including the color component, of the video data; and deriving the Rice parameter scaling value using the aggregated history counter value.

Clause 42: The method of clause 41, wherein calculating the aggregated history counter value comprises calculating ((StatCoeff[0]*w0)+StatCoeff[1]*w1+StatCoeff[2]*w2)/ (w1+w2+w3), wherein StatCoeff[0] represents a first history counter of the history counters for a first color component of the color components, StatCoeff[1] represents a second history counter of the history counters for a second color component of the color components, StatCoeff[2] represents a third history counter of the history counters for a third color component of the color components, and w1, w2, and w3 represent respective weighting values.

Clause 43: The method of clause 42, wherein deriving the Rice parameter scaling value comprises deriving the Rice parameter scaling value using (StatCoefAverage>=T)?P2: P1, wherein StatCoefAverage represents the aggregated history counter value and T, P1, and P2 represent input values.

Clause 44: The method of clause 43, wherein the input values for T, P1, and P2 are predetermined.

Clause 45: The method of clause 43, wherein the input values for T, P1, and P2 are signaled in the video data.

Clause 46: The method of clause 43, wherein T=4, P2=2 and P1=1.

Clause 47: The method of clause 43, wherein w0=2, w1=1, and w2=1.

Clause 48: The method of clause 36, wherein the block comprises a coding tree unit (CTU).

Clause 49: The method of clause 36, wherein the block comprises a transform unit (TU).

Clause 50: The method of clause 36, wherein the block comprises a sub-transform unit (sub-TU).

Clause 51: The method of clause 36, wherein the block comprises a first block and the Rice parameter scaling value comprises a first Rice parameter scaling value, the method further comprising deriving a second Rice parameter scaling value for a second block using the first Rice parameter scaling value.

Clause 52: The method of any of clauses 1-51, wherein coding comprises decoding

Clause 53: The method of any of clauses 1-52, wherein coding comprises encoding.

Clause 54: A device for coding video data, the device comprising one or more means for performing the method of any of clauses 1-53.

Clause 55: The device of clause 54, wherein the one or more means comprise one or more processors implemented in circuitry.

Clause 56: The device of any of clauses 54-55, further comprising a display configured to display decoded video data.

Clause 57: The device of any of clauses 54-56, wherein the device comprises one or more of a camera, a computer, a mobile device, a broadcast receiver device, or a set-top box.

Clause 58: The device of clause 54-57, further comprising a memory configured to store the video data.

Clause 59: A computer-readable storage medium having stored thereon instructions that, when executed, cause a processor of a device for decoding video data to perform the method of any of clauses 1-53.

Clause 60: A device for coding video data, the device comprising: means for calculating a sum of absolute values of a plurality of neighboring coefficients to a current coefficient for a current block of video data; means for calculating a base level offset value according to at least one of a bit depth for the video data or a slice type for a slice including the current block; means for calculating a normalized value for the sum of absolute values using the base level offset value; and means for coding the current coefficient using the normalized value for the sum of absolute values.

Clause 61: A device for coding video data, the device comprising: means for maintaining a history counter representing a history of Rice parameters used to code coefficients of a color component of video data; means for deriving a Rice parameter scaling value for a block of the color component of the video data from a current value for the history counter, without explicitly coding a value for the Rice parameter scaling value; means for calculating a sum of absolute values of a plurality of neighboring coefficients to a current coefficient of the block; means for calculating a scaled value for the sum of absolute values using the Rice parameter scaling value; and means for coding the current coefficient using the scaled value for the sum of absolute values.

Clause 62: A method of coding video data, the method comprising: calculating a sum of absolute values of a plurality of neighboring coefficients to a current coefficient for a current block of video data; calculating a base level offset value according to at least one of a bit depth for the video data or a slice type for a slice including the current block; calculating a normalized value for the sum of absolute values using the base level offset value; and coding the current coefficient using the normalized value for the sum of absolute values.

Clause 63: The method of clause 62, wherein the plurality of neighboring coefficients includes five neighboring coefficients to the current coefficient.

Clause 64: The method of clause 62, wherein the plurality of neighboring coefficients includes two right-neighboring coefficients to the current coefficient, two below-neighboring coefficients to the current coefficient, and one below-left neighboring coefficient to the current coefficient.

Clause 65: The method of clause 62, wherein calculating the base level offset value comprises calculating baseLevelOffset=(bitDepth>T)?(isIntra( )?P1:P2) (isIntra( )?P3:P4), wherein bitDepth comprises the bit depth for the video data, isIntra( ) returns a value of true if the slice type for the slice is an intra-predicted slice or false if the slice type for the slice is an inter-predicted slice, and T, P1, P2, P3, and P4 comprise respective input values.

Clause 66: The method of clause 65, wherein T=12.

Clause 67: The method of clause 66, wherein P1=5, P2=10, P3=6, and P4=20.

Clause 68: The method of clause 66, wherein P1=5, P2=10, P3=10, and P4=20.

Clause 69: The method of clause 65, wherein the input values for T, P1, P2, P3, and P4 are predetermined.

Clause 70: The method of clause 65, wherein the input values for T, P1, P2, P3, and P4 are signaled in the bitstream.

Clause 71: The method of clause 62, wherein calculating the normalized value for the sum of absolute values comprises calculating Clip3(0, 31, locSumAbs−baseLevelOffset), wherein locSumAbs comprises the sum of absolute values and baseLevelOffset comprises the base level offset value.

Clause 72: The method of clause 62, wherein coding the current coefficient using the normalized value for the sum of absolute values comprises: determining a Rice parameter corresponding to the normalized value for the sum of absolute values; and binarizing a value for the current coefficient using the Rice parameter to form a binarized value.

Clause 73: The method of clause 62, wherein the current block comprises a first block, a color component of the video data includes the first block, the sum of absolute values comprises a first sum of absolute values, and the plurality of neighboring coefficients comprises a first plurality of neighboring coefficients, the method further comprising: maintaining a history counter representing a history of Rice parameters used to code coefficients of the color component of the video data; deriving a Rice parameter scaling value for a second block of the color component of the video data from a current value for the history counter, without explicitly coding a value for the Rice parameter scaling value; calculating a second sum of absolute values of a second plurality of neighboring coefficients to a second coefficient of the second block; calculating a scaled value for the second sum of absolute values using the Rice parameter scaling value; and coding the second coefficient of the second block using the scaled value for the second sum of absolute values.

Clause 74: The method of clause 12, wherein deriving the Rice parameter scaling value comprises calculating (StatCoeff[idx]>=T)?P2:P1, wherein idx represents the color component, StatCoeff[idx] represents the current value for the history counter, and T, P1, and P2 represent input values.

Clause 75: The method of clause 13, wherein the input values for T, P1, and P2 are predetermined.

Clause 76: The method of clause 13, wherein the input values for T, P1, and P2 are signaled in the video data.

Clause 77: The method of clause 13, wherein T=4, P2=2 and P1=1.

Clause 78: The method of clause 12, wherein deriving the Rice parameter scaling value comprises: calculating an aggregated history counter value representing an aggregation of history counters, including the history counter, for all color components, including the color component, of the video data; and deriving the Rice parameter scaling value using the aggregated history counter value.

Clause 79: The method of clause 17, wherein calculating the aggregated history counter value comprises calculating ((StatCoeff[0]*w0)+StatCoeff[1]*w1+StatCoeff[2]*w2)/(w1+w2+w3), wherein StatCoeff[0] represents a first history counter of the history counters for a first color component of the color components, StatCoeff[1] represents a second history counter of the history counters for a second color component of the color components, StatCoeff[2] represents a third history counter of the history counters for a third color component of the color components, and w1, w2, and w3 represent respective weighting values.

Clause 80: The method of clause 18, wherein deriving the Rice parameter scaling value comprises deriving the Rice parameter scaling value using (StatCoefAverage>=T)?P2:P1, wherein StatCoefAverage represents the aggregated history counter value and T, P1, and P2 represent input values.

Clause 81: The method of clause 19, wherein the input values for T, P1, and P2 are predetermined.

Clause 82: The method of clause 19, wherein the input values for T, P1, and P2 are signaled in the video data.

Clause 83: The method of clause 19, wherein T=4, P2=2 and P1=1.

Clause 84: The method of clause 19, wherein w0=2, w1=1, and w2=1.

Clause 85: The method of clause 12, wherein the second block comprises one of a coding tree unit (CTU), a transform unit (TU), or a sub-transform unit (sub-TU).

Clause 86: The method of clause 62, wherein to code the current coefficient, the one or more processors are configured to decode the current coefficient using the normalized value for the sum of absolute values.

Clause 87: The method of clause 62, wherein to code the current coefficient, the one or more processors are configured to encode the current coefficient using the normalized value for the sum of absolute values.

Clause 88: A device for coding video data, the device comprising: a memory configured to store video data; and one or more processors implemented in circuitry and configured to: calculate a sum of absolute values of a plurality of neighboring coefficients to a current coefficient for a current block of video data; calculate a base level offset value according to at least one of a bit depth for the video data or a slice type for a slice including the current block; calculate a normalized value for the sum of absolute values using the base level offset value; and code the current coefficient using the normalized value for the sum of absolute values.

Clause 89: The device of clause 27, wherein the plurality of neighboring coefficients includes five neighboring coefficients to the current coefficient.

Clause 90: The device of clause 27, wherein the plurality of neighboring coefficients includes two right-neighboring coefficients to the current coefficient, two below-neighboring coefficients to the current coefficient, and one below-left neighboring coefficient to the current coefficient.

Clause 91: The device of clause 27, wherein to calculate the base level offset value, the one or more processors are configured to calculate baseLevelOffset=(bitDepth>T)?(isIntra( )?P1:P2):(isIntra( )?P3:P4), wherein bitDepth comprises the bit depth for the video data, isIntra( ) returns a value of true if the slice type for the slice is an intra-predicted slice or false if the slice type for the slice is an inter-predicted slice, and T, P1, P2, P3, and P4 comprise respective input values.

Clause 92: The device of clause 30, wherein T=12.

Clause 93: The device of clause 30, wherein the input values for T, P1, P2, P3, and P4 are predetermined.

Clause 94: The device of clause 27, wherein to calculate the normalized value for the sum of absolute values, the one or more processors are configured to calculate Clip3(0, 31, locSumAbs−baseLevelOffset), wherein locSumAbs comprises the sum of absolute values and baseLevelOffset comprises the base level offset value.

Clause 95: The device of clause 27, wherein to code the current coefficient using the normalized value for the sum of absolute values, the one or more processors are configured to: determine a Rice parameter corresponding to the normalized value for the sum of absolute values; and binarize a value for the current coefficient using the Rice parameter to form a binarized value.

Clause 96: The device of clause 27, wherein the current block comprises a first block, a color component of the video data includes the first block, the sum of absolute values comprises a first sum of absolute values, and the plurality of neighboring coefficients comprises a first plurality of neighboring coefficients, and wherein the one or more processors are further configured to: maintain a history counter representing a history of Rice parameters used to code coefficients of the color component of the video data; derive a Rice parameter scaling value for a second block of the color component of the video data from a current value for the history counter, without explicitly coding a value for the Rice parameter scaling value; calculate a second sum of absolute values of a second plurality of neighboring coefficients to a second coefficient of the second block; calculate a scaled value for the second sum of absolute values using the Rice parameter scaling value; and code the second coefficient of the second block using the scaled value for the second sum of absolute values.

Clause 97: The device of clause 35, wherein to derive the Rice parameter scaling value, the one or more processors are configured to calculate (StatCoeff[idx]>=T)?P2:P1, wherein idx represents the color component, StatCoeff[idx] represents the current value for the history counter, and T, P1, and P2 represent input values.

Clause 98: The device of clause 27, wherein to code the current coefficient, the one or more processors are configured to at least one of encode the current coefficient using the normalized value for the sum of absolute values or decode the current coefficient using the normalized value for the sum of absolute values.

Clause 99: The device of clause 27, further comprising a display configured to display decoded video data.

Clause 100: The device of clause 27, wherein the device comprises one or more of a camera, a computer, a mobile device, a broadcast receiver device, or a set-top box.

Clause 101: A computer-readable storage medium having stored thereon instructions that, when executed, cause a processor of a device for coding video data to: calculate a sum of absolute values of a plurality of neighboring coefficients to a current coefficient for a current block of video data; calculate a base level offset value according to at least one of a bit depth for the video data or a slice type for a slice including the current block; calculate a normalized value for the sum of absolute values using the base level offset value; and code the current coefficient using the normalized value for the sum of absolute values.

Clause 102: A device for coding video data, the device comprising: means for calculating a sum of absolute values of a plurality of neighboring coefficients to a current coefficient for a current block of video data; means for calculating a base level offset value according to at least one of a bit depth for the video data or a slice type for a slice including the current block; means for calculating a normalized value for the sum of absolute values using the base level offset value; and means for coding the current coefficient using the normalized value for the sum of absolute values.

Clause 103: A method of coding video data, the method comprising: calculating a sum of absolute values of a plurality of neighboring coefficients to a current coefficient for a current block of video data; calculating a base level offset value according to at least one of a bit depth for the video data or a slice type for a slice including the current block; calculating a normalized value for the sum of absolute values using the base level offset value; and coding the current coefficient using the normalized value for the sum of absolute values.

Clause 104: The method of clause 103, wherein the plurality of neighboring coefficients includes five neighboring coefficients to the current coefficient.

Clause 105: The method of any of clauses 103 and 104, wherein the plurality of neighboring coefficients includes two right-neighboring coefficients to the current coefficient, two below-neighboring coefficients to the current coefficient, and one below-left neighboring coefficient to the current coefficient.

Clause 106: The method of any of clauses 103-105, wherein calculating the base level offset value comprises calculating baseLevelOffset=(bitDepth>T)?(isIntra( )?P1:P2):(isIntra( )?P3:P4), wherein bitDepth comprises the bit depth for the video data, isIntra( ) returns a value of true if the slice type for the slice is an intra-predicted slice or false if the slice type for the slice is an inter-predicted slice, and T, P1, P2, P3, and P4 comprise respective input values.

Clause 107: The method of clause 106, wherein T=12.

Clause 108: The method of clause 107, wherein P1=5, P2=10, P3=6, and P4=20.

Clause 109: The method of clause 107, wherein P1=5, P2=10, P3=10, and P4=20.

Clause 110: The method of any of clauses 106-109, wherein the input values for T, P1, P2, P3, and P4 are predetermined.

Clause 111: The method of any of clauses 106-109, wherein the input values for T, P1, P2, P3, and P4 are signaled in the bitstream.

Clause 112: The method of any of clauses 103-111, wherein calculating the normalized value for the sum of absolute values comprises calculating Clip3(0, 31, locSumAbs−baseLevelOffset), wherein locSumAbs comprises the sum of absolute values and baseLevelOffset comprises the base level offset value.

Clause 113: The method of any of clauses 103-112, wherein coding the current coefficient using the normalized value for the sum of absolute values comprises: determining a Rice parameter corresponding to the normalized value for the sum of absolute values; and binarizing a value for the current coefficient using the Rice parameter to form a binarized value.

Clause 114: The method of any of clauses 103-113, wherein the current block comprises a first block, a color component of the video data includes the first block, the sum of absolute values comprises a first sum of absolute values, and the plurality of neighboring coefficients comprises a first plurality of neighboring coefficients, the method further comprising: maintaining a history counter representing a history of Rice parameters used to code coefficients of the color component of the video data; deriving a Rice parameter scaling value for a second block of the color component of the video data from a current value for the history counter, without explicitly coding a value for the Rice parameter scaling value; calculating a second sum of absolute values of a second plurality of neighboring coefficients to a second coefficient of the second block; calculating a scaled value for the second sum of absolute values using the Rice parameter scaling value; and coding the second coefficient of the second block using the scaled value for the second sum of absolute values.

Clause 115: The method of clause 114, wherein deriving the Rice parameter scaling value comprises calculating (StatCoeff[idx]>=T)?P2:P1, wherein idx represents the color component, StatCoeff[idx] represents the current value for the history counter, and T, P1, and P2 represent input values.

Clause 116: The method of clause 115, wherein the input values for T, P1, and P2 are predetermined.

Clause 117: The method of clause 115, wherein the input values for T, P1, and P2 are signaled in the video data.

Clause 118: The method of any of clauses 115-117, wherein T=4, P2=2 and P1=1.

Clause 119: The method of any of clauses 114-118, wherein deriving the Rice parameter scaling value comprises: calculating an aggregated history counter value representing an aggregation of history counters, including the history counter, for all color components, including the color component, of the video data; and deriving the Rice parameter scaling value using the aggregated history counter value.

Clause 120: The method of clause 119, wherein calculating the aggregated history counter value comprises calculating ((StatCoeff[0]*w0)+StatCoeff[1]*w1+StatCoeff[2]*w2)/(w1+w2+w3), wherein StatCoeff[0] represents a first history counter of the history counters for a first color component of the color components, StatCoeff[1] represents a second history counter of the history counters for a second color component of the color components, StatCoeff[2] represents a third history counter of the history counters for a third color component of the color components, and w1, w2, and w3 represent respective weighting values.

Clause 121: The method of clause 120, wherein deriving the Rice parameter scaling value comprises deriving the Rice parameter scaling value using (StatCoefAverage>=T)?P2:P1, wherein StatCoefAverage represents the aggregated history counter value and T, P1, and P2 represent input values.

Clause 122: The method of clause 121, wherein the input values for T, P1, and P2 are predetermined.

Clause 123: The method of clause 121, wherein the input values for T, P1, and P2 are signaled in the video data.

Clause 124: The method of any of clauses 121-123, wherein T=4, P2=2 and P1=1.

Clause 125: The method of any of clauses 121-124, wherein w0=2, w1=1, and w2=1.

Clause 126: The method of any of clauses 114-125, wherein the second block comprises one of a coding tree unit (CTU), a transform unit (TU), or a sub-transform unit (sub-TU).

Clause 127: The method of any of clauses 103-126, wherein to code the current coefficient, the one or more processors are configured to decode the current coefficient using the normalized value for the sum of absolute values.

Clause 128: The method of any of clauses 103-127, wherein to code the current coefficient, the one or more processors are configured to encode the current coefficient using the normalized value for the sum of absolute values.

Clause 129: A device for coding video data, the device comprising: a memory configured to store video data; and one or more processors implemented in circuitry and configured to: calculate a sum of absolute values of a plurality of neighboring coefficients to a current coefficient for a current block of video data; calculate a base level offset value according to at least one of a bit depth for the video data or a slice type for a slice including the current block; calculate a normalized value for the sum of absolute values using the base level offset value; and code the current coefficient using the normalized value for the sum of absolute values.

Clause 130: The device of clause 129, wherein the plurality of neighboring coefficients includes five neighboring coefficients to the current coefficient.

Clause 131: The device of any of clauses 129 and 130, wherein the plurality of neighboring coefficients includes two right-neighboring coefficients to the current coefficient, two below-neighboring coefficients to the current coefficient, and one below-left neighboring coefficient to the current coefficient.

Clause 132: The device of any of clauses 129-131, wherein to calculate the base level offset value, the one or more processors are configured to calculate baseLevelOffset=(bitDepth>T)?(isIntra( )?P1:P2):(isIntra( )?P3:P4), wherein bitDepth comprises the bit depth for the video data, isIntra( ) returns a value of true if the slice type for the slice is an intra-predicted slice or false if the slice type for the slice is an inter-predicted slice, and T, P1, P2, P3, and P4 comprise respective input values.

Clause 133: The device of clause 132, wherein T=12.

Clause 134: The device of any of clauses 132 and 133, wherein the input values for T, P1, P2, P3, and P4 are predetermined.

Clause 135: The device of any of clauses 129-134, wherein to calculate the normalized value for the sum of absolute values, the one or more processors are configured to calculate Clip3(0, 31, locSumAbs−baseLevelOffset), wherein locSumAbs comprises the sum of absolute values and baseLevelOffset comprises the base level offset value.

Clause 136: The device of clause 135, wherein to code the current coefficient using the normalized value for the sum of absolute values, the one or more processors are configured to: determine a Rice parameter corresponding to the normalized value for the sum of absolute values; and binarize a value for the current coefficient using the Rice parameter to form a binarized value.

Clause 137: The device of any of clauses 129-136, wherein the current block comprises a first block, a color component of the video data includes the first block, the sum of absolute values comprises a first sum of absolute values, and the plurality of neighboring coefficients comprises a first plurality of neighboring coefficients, and wherein the one or more processors are further configured to: maintain a history counter representing a history of Rice parameters used to code coefficients of the color component of the video data; derive a Rice parameter scaling value for a second block of the color component of the video data from a current value for the history counter, without explicitly coding a value for the Rice parameter scaling value; calculate a second sum of absolute values of a second plurality of neighboring coefficients to a second coefficient of the second block; calculate a scaled value for the second sum of absolute values using the Rice parameter scaling value; and code the second coefficient of the second block using the scaled value for the second sum of absolute values.

Clause 138: The device of clause 137, wherein to derive the Rice parameter scaling value, the one or more processors are configured to calculate (StatCoeff[idx]>=T)?P2:P1, wherein idx represents the color component, StatCoeff[idx] represents the current value for the history counter, and T, P1, and P2 represent input values.

Clause 139: The device of any of clauses 129-138, wherein to code the current coefficient, the one or more processors are configured to at least one of encode the current coefficient using the normalized value for the sum of absolute values or decode the current coefficient using the normalized value for the sum of absolute values.

Clause 140: The device of any of clauses 129-139, further comprising a display configured to display decoded video data.

Clause 141: The device of any of clauses 129-140, wherein the device comprises one or more of a camera, a computer, a mobile device, a broadcast receiver device, or a set-top box.

Clause 142: A computer-readable storage medium having stored thereon instructions that, when executed, cause a processor of a device for coding video data to: calculate a sum of absolute values of a plurality of neighboring coefficients to a current coefficient for a current block of video data; calculate a base level offset value according to at least one of a bit depth for the video data or a slice type for a slice including the current block; calculate a normalized value for the sum of absolute values using the base level offset value; and code the current coefficient using the normalized value for the sum of absolute values.

Clause 143: A device for coding video data, the device comprising: means for calculating a sum of absolute values of a plurality of neighboring coefficients to a current coefficient for a current block of video data; means for calculating a base level offset value according to at least one of a bit depth for the video data or a slice type for a slice including the current block; means for calculating a normalized value for the sum of absolute values using the base level offset value; and means for coding the current coefficient using the normalized value for the sum of absolute values.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
calculating a sum of absolute values of a plurality of neighboring coefficients to a current coefficient for a current block of video data;
calculating a base level offset value according to at least one of a bit depth for the video data or a slice type for a slice including the current block;
calculating a normalized value for the sum of absolute values using the base level offset value; and
coding the current coefficient using the normalized value for the sum of absolute values.

2. The method of claim 1, wherein the plurality of neighboring coefficients includes five neighboring coefficients to the current coefficient.

3. The method of claim 1, wherein the plurality of neighboring coefficients includes two right-neighboring coefficients to the current coefficient, two below-neighboring coefficients to the current coefficient, and one below-left neighboring coefficient to the current coefficient.

4. The method of claim 1, wherein calculating the base level offset value comprises calculating baseLevelOffset=(bitDepth>T)?(isIntra( )?P1:P2):(isIntra( )?P3:P4), wherein baseLevelOffset is the base level offset value, bitDepth comprises the bit depth for the video data, isIntra( ) returns a value of true if the slice type for the slice is an intra-predicted slice or false if the slice type for the slice is an inter-predicted slice, and T, P1, P2, P3, and P4 comprise respective input values.

5. The method of claim 4, wherein T=12.

6. The method of claim 5, wherein P1=5, P2=10, P3=6, and P4=20.

7. The method of claim 5, wherein P1=5, P2=10, P3=10, and P4=20.

8. The method of claim 4, wherein the input values for T, P1, P2, P3, and P4 are predetermined.

9. The method of claim 4, wherein the input values for T, P1, P2, P3, and P4 are signaled in the bitstream.

10. The method of claim 1, wherein calculating the normalized value for the sum of absolute values comprises calculating Clip3(0, 31, locSumAbs−baseLevelOffset), wherein locSumAbs comprises the sum of absolute values and baseLevelOffset comprises the base level offset value.

11. The method of claim 1, wherein coding the current coefficient using the normalized value for the sum of absolute values comprises:
determining a Rice parameter using the normalized value for the sum of absolute values; and
binarizing a value for the current coefficient using the Rice parameter to form a binarized value.

12. The method of claim 1, wherein the current block comprises a first block, a color component of the video data includes the first block, the sum of absolute values comprises a first sum of absolute values, and the plurality of neighboring coefficients comprises a first plurality of neighboring coefficients, the method further comprising:
maintaining a history counter representing a history of Rice parameters used to code coefficients of the color component of the video data;
deriving a Rice parameter scaling value for a second block of the color component of the video data from a current value for the history counter, without explicitly coding a value for the Rice parameter scaling value;
calculating a second sum of absolute values of a second plurality of neighboring coefficients to a second coefficient of the second block;
calculating a scaled value for the second sum of absolute values using the Rice parameter scaling value; and
coding the second coefficient of the second block using the scaled value for the second sum of absolute values.

13. The method of claim 12, wherein deriving the Rice parameter scaling value comprises calculating (StatCoeff[idx]>=T)?P2:P1, wherein idx represents the color component, StatCoeff[idx] represents the current value for the history counter, and T, P1, and P2 represent input values.

14. The method of claim 13, wherein the input values for T, P1, and P2 are predetermined.

15. The method of claim 13, wherein the input values for T, P1, and P2 are signaled in the video data.

16. The method of claim 13, wherein T=4, P2=2 and P1=1.

17. The method of claim 12, wherein deriving the Rice parameter scaling value comprises:
calculating an aggregated history counter value representing an aggregation of history counters, including the history counter, for all color components, including the color component, of the video data; and
deriving the Rice parameter scaling value using the aggregated history counter value.

18. The method of claim 17, wherein calculating the aggregated history counter value comprises calculating ((StatCoeff[0]*w0)+StatCoeff[1]*w1+StatCoeff[2]*w2)/(w1+w2+w3), wherein StatCoeff[0] represents a first history counter of the history counters for a first color component of the color components, StatCoeff[1] represents a second history counter of the history counters for a second color component of the color components, StatCoeff[2] represents a third history counter of the history counters for a third color component of the color components, and w1, w2, and w3 represent respective weighting values.

19. The method of claim 18, wherein deriving the Rice parameter scaling value comprises deriving the Rice parameter scaling value using (StatCoefAverage>=T)?P2:P1, wherein StatCoefAverage represents the aggregated history counter value and T, P1, and P2 represent input values.

20. The method of claim 19, wherein the input values for T, P1, and P2 are predetermined.

21. The method of claim 19, wherein the input values for T, P1, and P2 are signaled in the video data.

22. The method of claim 19, wherein T=4, P2=2 and P1=1.

23. The method of claim 19, wherein w0=2, w1=1, and w2=1.

24. The method of claim 12, wherein the second block comprises one of a coding tree unit (CTU), a transform unit (TU), or a sub-transform unit (sub-TU).

25. The method of claim 1, wherein coding the current coefficient comprises decoding the current coefficient using the normalized value for the sum of absolute values.

26. The method of claim 1, wherein coding the current coefficient comprises encoding the current coefficient using the normalized value for the sum of absolute values.

27. A device for coding video data, the device comprising:
a memory configured to store video data; and
one or more processors implemented in circuitry and configured to:
calculate a sum of absolute values of a plurality of neighboring coefficients to a current coefficient for a current block of video data;
calculate a base level offset value according to at least one of a bit depth for the video data or a slice type for a slice including the current block;

calculate a normalized value for the sum of absolute values using the base level offset value; and code the current coefficient using the normalized value for the sum of absolute values.

28. The device of claim 27, wherein the plurality of neighboring coefficients includes five neighboring coefficients to the current coefficient.

29. The device of claim 27, wherein the plurality of neighboring coefficients includes two right-neighboring coefficients to the current coefficient, two below-neighboring coefficients to the current coefficient, and one below-left neighboring coefficient to the current coefficient.

30. The device of claim 27, wherein to calculate the base level offset value, the one or more processors are configured to calculate baseLevelOffset=(bitDepth>T)?(isIntra( )?P1:P2):(isIntra( )?P3:P4), wherein baseLevelOffset comprises the base level offset value, bitDepth comprises the bit depth for the video data, isIntra( ) returns a value of true if the slice type for the slice is an intra-predicted slice or false if the slice type for the slice is an inter-predicted slice, and T, P1, P2, P3, and P4 comprise respective input values.

31. The device of claim 30, wherein T=12.

32. The device of claim 30, wherein the input values for T, P1, P2, P3, and P4 are predetermined.

33. The device of claim 27, wherein to calculate the normalized value for the sum of absolute values, the one or more processors are configured to calculate Clip3(0, 31, locSumAbs−baseLevelOffset), wherein locSumAbs comprises the sum of absolute values and baseLevelOffset comprises the base level offset value.

34. The device of claim 27, wherein to code the current coefficient using the normalized value for the sum of absolute values, the one or more processors are configured to:

determine a Rice parameter using the normalized value for the sum of absolute values; and binarize a value for the current coefficient using the Rice parameter to form a binarized value.

35. The device of claim 27, wherein the current block comprises a first block, a color component of the video data includes the first block, the sum of absolute values comprises a first sum of absolute values, and the plurality of neighboring coefficients comprises a first plurality of neighboring coefficients, and wherein the one or more processors are further configured to:

maintain a history counter representing a history of Rice parameters used to code coefficients of the color component of the video data;

derive a Rice parameter scaling value for a second block of the color component of the video data from a current value for the history counter, without explicitly coding a value for the Rice parameter scaling value;

calculate a second sum of absolute values of a second plurality of neighboring coefficients to a second coefficient of the second block;

calculate a scaled value for the second sum of absolute values using the Rice parameter scaling value; and code the second coefficient of the second block using the scaled value for the second sum of absolute values.

36. The device of claim 35, wherein to derive the Rice parameter scaling value, the one or more processors are configured to calculate (StatCoeff[idx]>=T)?P2:P1, wherein idx represents the color component, StatCoeff[idx] represents the current value for the history counter, and T, P1, and P2 represent input values.

37. The device of claim 27, wherein to code the current coefficient, the one or more processors are configured to at least one of encode the current coefficient using the normalized value for the sum of absolute values or decode the current coefficient using the normalized value for the sum of absolute values.

38. The device of claim 27, further comprising a display configured to display decoded video data.

39. The device of claim 27, wherein the device comprises one or more of a camera, a computer, a mobile device, a broadcast receiver device, or a set-top box.

40. A device for coding video data, the device comprising:

means for calculating a sum of absolute values of a plurality of neighboring coefficients to a current coefficient for a current block of video data;

means for calculating a base level offset value according to at least one of a bit depth for the video data or a slice type for a slice including the current block;

means for calculating a normalized value for the sum of absolute values using the base level offset value; and means for coding the current coefficient using the normalized value for the sum of absolute values.

* * * * *